(12) United States Patent
Yeap et al.

(10) Patent No.: US 6,456,657 B1
(45) Date of Patent: Sep. 24, 2002

(54) FREQUENCY DIVISION MULTIPLEXED TRANSMISSION OF SUB-BAND SIGNALS

(75) Inventors: Tet Hin Yeap; Esam Mostafa Abdel-Raheem, both of Ottawa (CA)

(73) Assignee: Bell Canada, Montreal (CA)

( * ) Notice: Subject to any disclaimer, the term of this patent is extended or adjusted under 35 U.S.C. 154(b) by 0 days.

(21) Appl. No.: 09/269,152

(22) PCT Filed: Aug. 29, 1997

(86) PCT No.: PCT/CA97/00608

§ 371 (c)(1),
(2), (4) Date: Oct. 6, 1999

(87) PCT Pub. No.: WO98/09383

PCT Pub. Date: Mar. 5, 1998

(30) Foreign Application Priority Data

Aug. 30, 1996 (CA) ............................................ 2184541

(51) Int. Cl.[7] .................................................. H04N 7/12

(52) U.S. Cl. .................................. 375/240.12; 382/234

(58) Field of Search ........................... 375/240.11, 353, 375/240.12; 382/234, 300

(56) References Cited

U.S. PATENT DOCUMENTS

| | | | |
|---|---|---|---|
| 3,875,341 A | 4/1975 | Gassmann | 179/15.55 R |
| 5,067,015 A | * 11/1991 | Combridge et al. | 358/133 |
| 5,161,210 A | 11/1992 | Druyvesteyn et al. | 395/2 |
| 5,214,678 A | 5/1993 | Rault et al. | 375/122 |
| 5,479,447 A | 12/1995 | Chow et al. | 375/260 |
| 5,497,398 A | 3/1996 | Tzannes et al. | 375/260 |
| 5,621,855 A | 4/1997 | Veldhuis et al. | 395/2.38 |
| 5,864,800 A | * 1/1999 | Imai et al. | 740/229 |

OTHER PUBLICATIONS

Yow–Yong Liu, Ya–Qin Zhang: "Wavelet–coded Image Transmission Over Land Mobile Radio Channels", IEEE Global Telecommunications Conference, Dec. 6–9, 1992, New York, U.S., pp. 235–239, XP000357791.

Heegard, Shamoon: "High–Fidelity Audio Compression: Fractional–Band Wavelets", IEEE International Conference on Acoustics, Speech and Signal Processing, Mar. 23–26, 1992, New York, U.S., pp. 201–204, XP000356972.

(List continued on next page.)

*Primary Examiner*—Chris Kelley
*Assistant Examiner*—George A Bugg, Jr.
(74) *Attorney, Agent, or Firm*—Thomas Adams

(57) ABSTRACT

A method and apparatus for processing an input signal for transmission and/or storage, uses an analysis filter bank (21;51) to decompose the signal into sub-band signals which are used to modulate a plurality of carriers. The carriers are combined into a single encoded signal for transmission/storage. The encoder/decoder is especially applicable to telecommunications systems and recording systems. The analysis filter bank may comprise a multiresolution filter, such as an octave band filter bank (40A/B/C/D . . . 43A/B/C/D) implementing Discrete Wavelet Transform. The modulation may comprise double-sideband, single sideband, quadrature amplitude modulation, and so on. Where the input signal is analog, the carriers may be modulated directly by the sub-band signals. Where the input signal is digital, however, the sub-band signals are interpolated, all to the same rate, and then used to modulate the carriers. The corresponding decoder (13) extracts the modulated carrier signals, demodulates them, decimates them (if applicable) and then synthesizes them to reconstruct the original input signal. One or more of the sub-bands, especially at the higher frequencies, may be discarded. Discrete wavelet transformation is applied to segments of the digital signal.

60 Claims, 17 Drawing Sheets

OTHER PUBLICATIONS

Herley, Vetterli: "Orthogonal Time–Varying Filter Banks and Wavelets", Proceedings of the IEEE International Symposium on Circuits and Systems, May 3–6, 1993, New York, U.S., pp. 391–394, XP000410017.

Sandberg, Stuart D., Tzannes, Michael A.: "Overlapped Discrete Multitone Modulation for High Speed Copper Wire Communications", IEEE Journal on Selected Areas in Communications, vol. 13, No. 9, Dec., 1995.

"Discrete Wavelet Multitone Technology".

Lee, Inkyu; Chow, Jacky S.; and Cioffi, John M.: "Performance Evaluation of a Fast Computation Algorithm for the DMT in High–Speed Subscriber Loop", IEEE Journal on Selected Areas in Communications, vol. 13, No. 9, Dec. 1995.

Tzannes, M.A.; Tzannes, M.C.; and Resnikoff, H.L.: "The DWMT: A Multicarrier Transceiver for ADSL using M–Band Wavelets", ANSI Standard Committee T1E1.4 Contribution 93–067, Mar. 1993.

* cited by examiner

US 6,456,657 B1

FREQUENCY DIVISION MULTIPLEXED TRANSMISSION OF SUB-BAND SIGNALS

BACKGROUND OF THE INVENTION

1. Technical Field

The invention relates to a method and apparatus for encoding digital signals for transmission and/or storage. The invention is especially, but not exclusively, applicable to the encoding of digital signals for transmission via communications channels, such as twisted wire pair subscriber loops in telecommunications systems, or to storage of signals in or on a storage medium, such as video signal recordings, audio recordings, data storage in computer systems, and so on.

2. Background Art

Embodiments of the invention are especially applicable to Asynchronous Transfer Mode (ATM) telecommunications systems. Such systems are now available to transmit millions of data bits in a single second and are expected to turn futuristic interactive concepts into exciting realities within the next few years. However, deployment of ATM is hindered by expensive port cost and the cost of running an optical fiber from an ATM switch to the customer-premises using an architecture known as Fiber-to-the-home. Running ATM traffic in part of the subscriber loop over existing copper wires would reduce the cost considerably and render the connection of ATM to customer-premises feasible.

The introduction of ATM signals in the existing twisted-pair subscriber loops leads to a requirement for bit rates which are higher than can be achieved with conventional systems in which there is a tendency, when transmitting at high bit rates, to lose a portion of the signal, typically the higher frequency part, causing the signal quality to suffer significantly. This is particularly acute in two-wire subscriber loops, such as socalled twisted wire pairs. Using quadrature amplitude modulation (QAM), it is possible to meet the requirements for Asymmetric Digital Subscriber Loops (ADSL), involving rates as high as 1.5 megabits per second for loops up to 3 kilometers long with specified error rates. It is envisaged that ADSL systems will allow rates up to about 8 megabits per second over 1 kilometer loops. Nevertheless, these rates are still considered to be too low, given that standards currently proposed for ATM basic subscriber access involve rates of about 26 megabits per second.

QAM systems tend to operate at the higher frequency bands of the channel, which is particularly undesirable for two-wire subscriber loops where attenuation and cross-talk are worse at the higher frequencies. It has been proposed, therefore, to use frequency division modulation (FDM) to divide the transmission system into a set of frequency-indexed sub-channels. The input data is partitioned into temporal blocks, each of which is independently modulated and transmitted in a respective one of the sub-channels. One such system, known as discrete multi-tone transmission (DMT), is disclosed in U.S. Pat. No. 5,479,447 issued December 1995 and in an article entitled "Performance Evaluation of a Fast Computation Algorithm for the DMT in High-Speed Subscriber Loop", IEEE Journal on Selected Areas in Communications, Vol. 13, No. 9, December 1995 by I. Lee et al. Specifically, U.S. Pat. No. 5,479,447 discloses a method and apparatus for adaptive, variable bandwidth, high-speed data transmission of a multi-carrier signal over a digital subscriber loop. The data to be transmitted is divided into multiple data streams which are used to modulate multiple carriers. These modulated carriers are converted to a single high speed signal by means of IFFT (Inverse Fast Fourier Transform) before transmission. At the receiver, Fast Fourier Transform (FFT) is used to split the received signal into modulated carriers which are demodulated to obtain the original multiple data streams.

Such a DMT system is not entirely satisfactory for use in two-wire subscriber loops which are very susceptible to noise and other sources of degradation which could result in one or more sub-channels being lost. If only one sub-channel fails, perhaps because of transmission path noise, the total signal is corrupted and either lost or, if error detection is employed, may be retransmitted. It has been proposed to remedy this problem by adaptively eliminating noisy sub-channels, but to do so would involve very complex circuitry.

A further problem with DMT systems is poor separation between sub-channels. In U.S. Pat. No. 5,497,398 issued March 1996, M. A. Tzannes and M. C. Tzannes proposed ameliorating the problem of degradation due to sub-channel loss, and obtaining superior burst noise immunity, by replacing the Fast Fourier Transform with a lapped transform, thereby increasing the difference between the main lobe and side lobes of the filter response in each sub-channel. The lapped transform may comprise wavelets, as disclosed by M. A. Tzannes, M. C. Tzannes and H. L. Resnikoff in an article "The DWMT: A Multicarrier Transceiver for ADSL using M-band Wavelets", ANSI Standard Committee T1E1.4 Contribution 93-067, March 1993 and by S. D. Sandberg, M. A. Tzannes in an article "Overlapped Discrete Multitone Modulation for High Speed Copper Wire Communications", IEEE Journal on Selected Areas in Comm., Vol. 13, No. 9, pp. 1571–1585, Dec. 1995, such systems being referred to as "Discrete Wavelet Multitone (DWNIT).

A disadvantage of both DMT and DWMT systems is that they typically use a large number of sub-channels, for example 256 or 512, which leads to complex, costly equipment and equalization and synchronization difficulties. These difficulties are exacerbated if, to take advantage of the better characteristics of the two-wire subscriber loop at lower frequencies, the number of bits transmitted at the lower frequencies is increased and the number of bits transmitted at the higher frequencies reduced correspondingly.

It is known to use sub-band filtering to process digital audio signals prior to recording on a storage medium, such as a compact disc. Thus, U.S. Pat. No. No. 5,214,678 (Rault et al) discloses an arrangement for encoding audio signals and the like into a set of sub-band signals using a commutator and a plurality of analysis filters, which could be combined. Rault et al use recording means which record the sub-band signals as multiple, distinct tracks. This is not entirely satisfactory because each sub-band signal would require its own recording head or, if applied to transmission, its own transmission channel.

It is also known to use sub-band filtering for compression of audio signals, as disclosed by C. Heegard and T. Shamoon in "High-Fidelity Audio Compression: Fractional-Band Wavelet", 1992 IEEE Conference on Acoustics, Speech and Signal Processing, 23–26 March 1992, New York.

In an article entitled "Wavelet-Coded Image Transmission Over Land Mobile Radio Channels, IEEE Global Telecommunications Conference, 6–9 December 1992, New York, You-Jong Liu et al disclosed the use of two-dimensional wavelet decomposition to convert an image into sub-images. The sub-images were quantized to produce digital numeric representations which were transmitted.

U.S. Pat. No. 5,161,210 (Druyvesteyn) discloses a similar analysis technique to that disclosed by Rault et al but, in this case, the sub-band signals are combined by means of a synthesis filter before recordal. The input audio signal first is analyzed, and an identification signal is mixed with each of the sub-band signals. The sub-band signals then are recombined using a synthesis filter. The technique ensures that the identification signal cannot be removed simply by normal filtering. The frequency spectrum of the recombined signal is substantially the same as that of the input signal, so it would still be susceptible to corruption by loss of the higher frequency components. The corresponding decoder also comprises an analysis filter and a synthesis filter. Consequently, the apparatus is very complex and would involve delays which would be detrimental in high speed transmission systems.

It is desirable to combine the sub-band signals in such a way as to reduce the risk of corruption resulting from part of the signal being lost or corrupted during transmission and/or storage.

It should be noted that, although Rault et al use the term "analysis filter" in their specification, in this specification the term "analysis filter" will be used to denote a device which decomposes a signal into a plurality of sub-band signals in such a way that the original signal can be reconstructed using a complementary synthesis filter.

SUMMARY OF THE INVENTION

The present invention seeks to eliminate, or at least mitigate, the disadvantages of these known systems and has for its object to provide an improved method and apparatus for encoding signals for transmission and/or storage.

According to one aspect of the invention, apparatus for encoding an input signal for transmission or storage and decoding such encoded signal to reconstruct the input signal, comprising an encoder (11) for encoding a digital input signal for transmission or storage and a decoder (13) for decoding such encoded signal to reconstruct the input signal, the encoder comprising analysis filter bank means (21;51) for analyzing the input signal into a plurality of sub-band signals, each sub-band centered at a respective one of a corresponding plurality of frequencies and the decoder comprising synthesis filter bank means (33;67) complementary to said analysis filter bank means for producing a decoded signal corresponding to the input signal, characterized in that: the encoder (11) comprises
(i) interpolation means (52) for interpolating of the plurality of sub-band signals to provide a plurality of interpolated signals each occupying the same frequency band as the others; and
(ii) combining means (23;58) for combining the interpolated sub-band signals to form
the encoded signal for transmission or storage; and the decoder (13) comprises
(iii) means (31;61$_0$, 61$_1$, 61$_2$) for extracting the interpolated sub-band signals from the received or recorded encoded signal;
(iv) decimator means (66) for decimating each of the plurality of extracted interpolated sub-band signals to remove the interpolated values and applying the decimated signals to the synthesis filter bank means, the synthesis filter bank means processing the plurality of decimated sub-band signals to reconstruct said input signal.

According to second and third aspects of the invention, there are provided the encoder per se and the decoder per se of the apparatus.

The analysis filter means may be uniform, for example an M-band filter bank or Short-time Fast Fourier Transform unit; or non-uniform, for example a "multiresolution" filter bank such as an octave-band or dyadic filter bank implementing discrete wavelet transform (DWT) which will produce sub-bands having different bandwidths, typically each half the width of its neighbour.

The interpolation rate may be such that the resulting interpolated sub-band signals all have the same rate.

The interpolation rate will be chosen according to the requirements of a particular transmission channel or storage means but typically will be of the order of 1:8 or more.

The interpolation means may comprise an upsampler, for interpolating intervals between actual values, and filter means, for example Raise Cosine filter means, for determining values between the actual samples and inserting them at the appropriate intervals.

Usually, when used with digital signals, sub-band analysis filter banks create sub-band signals which occupy a wide spectrum as compared with the original signal, which makes modulation difficult. Interpolating and smoothing the sub-band signals advantageously band-limits the spectrum of the sub-band signals, permitting modulation by a variety of techniques, for example Double or Single Sideband Amplitude Modulation, Quadrature Amplitude Modulation (QAM), Carrier Amplitude/Phase modulation (CAP), and so on.

According to a fourth aspect of the invention, there is provided a method of encoding an input signal for transmission or storage and decoding such encoded signal to reconstruct the input signal, the encoding of the input signal comprising the steps of using analysis filter bank means to analyze the input signal into a plurality of sub-band signals, each sub-band centered at a respective one of a corresponding plurality of frequencies, characterized in that the encoding comprises the steps of:
(i) interpolating each of the plurality of sub-band signals to provide a corresponding plurality of interpolated sub-band signals each occupying the same frequency band as the others; and
(ii) combining the interpolated sub-band signals to form the encoded signal for transmission or storage;
and the decoding of the encoded signal comprises the steps of:
(iii) extracting the plurality of interpolated sub-band signals from the received or recorded encoded signal;
(iv) decimating each of the plurality of extracted interpolated sub-band signals to remove values interpolated during encoding; and
(v) using synthesis filter bank means complementary to said analysis filter bank means, processing the plurality of decimated sub-band signals to produce a decoded signal corresponding to the input signal.

According to fifth and sixth aspects of the invention, there are provided the method of encoding per se and the method of decoding per se.

In embodiments of any of the above aspects of the invention which use Discrete Wavelet Transform, the digital input signal may be divided into segments and the discrete wavelet transform used to transform successive segments of the digital signal.

The foregoing and other objects, features, aspects and advantages of the present invention will become more apparent from the following detailed description of preferred embodiments of the invention which are described by way of example only with reference to the accompanying drawings.

DESCRIPTION OF THE PREFERRED EMBODIMENTS

Figure 1:
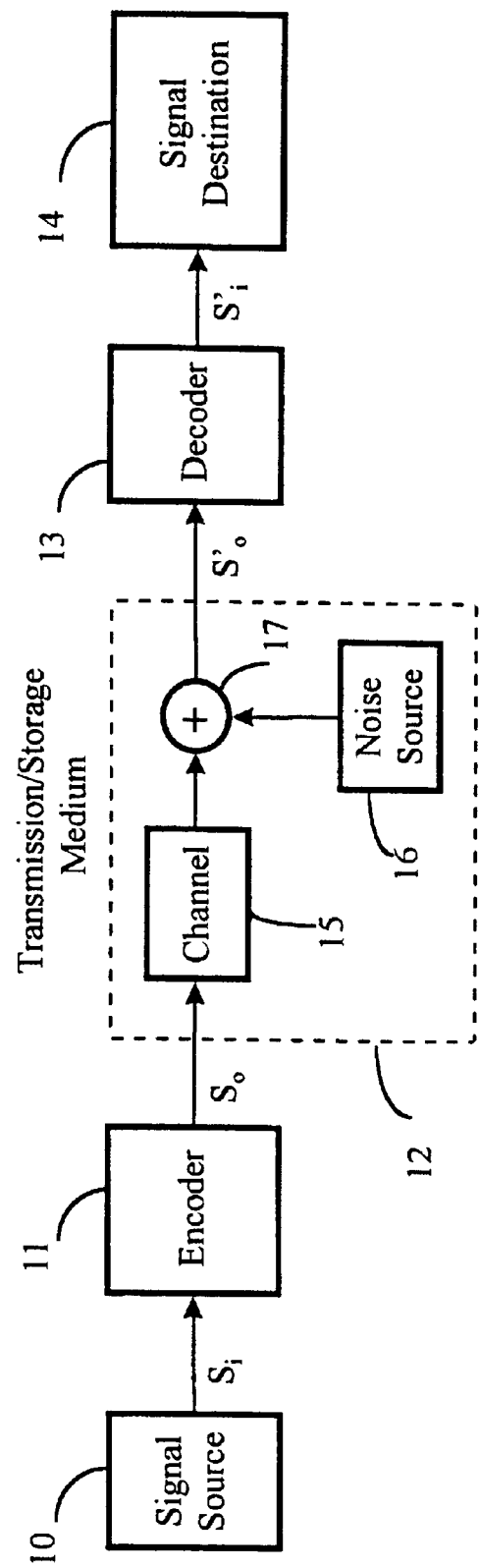
FIG. 1 is a simplified schematic diagram illustrating a transmission system including an encoder and decoder according to the invention.

A transmission system embodying the present invention is illustrated in FIG. 1. The system comprises digital input signal source 10, an encoder 11, transmission medium 12, decoder 13 and signal destination 14. Input signal $S_1$ from signal source 10 is applied to the encoder 11 which encodes it using sub-band filtering and multi-carrier modulation and supplies the resulting encoded signal $S_o$ to transmission medium 12, which is represented by a transmission channel 15, noise source 16 and summer 17, the later combining noise with the signal in the transmission channel 15 before it reaches the decoder 13. Although a transmission medium 12 is illustrated, it could be an analogous storage medium instead. The output of the decoder 13 is supplied to the signal destination 14. The usable bandwidth of channel 15 dictates the maximum allowable rate of a signal that could be transmitted over the channel.

Figure 2:
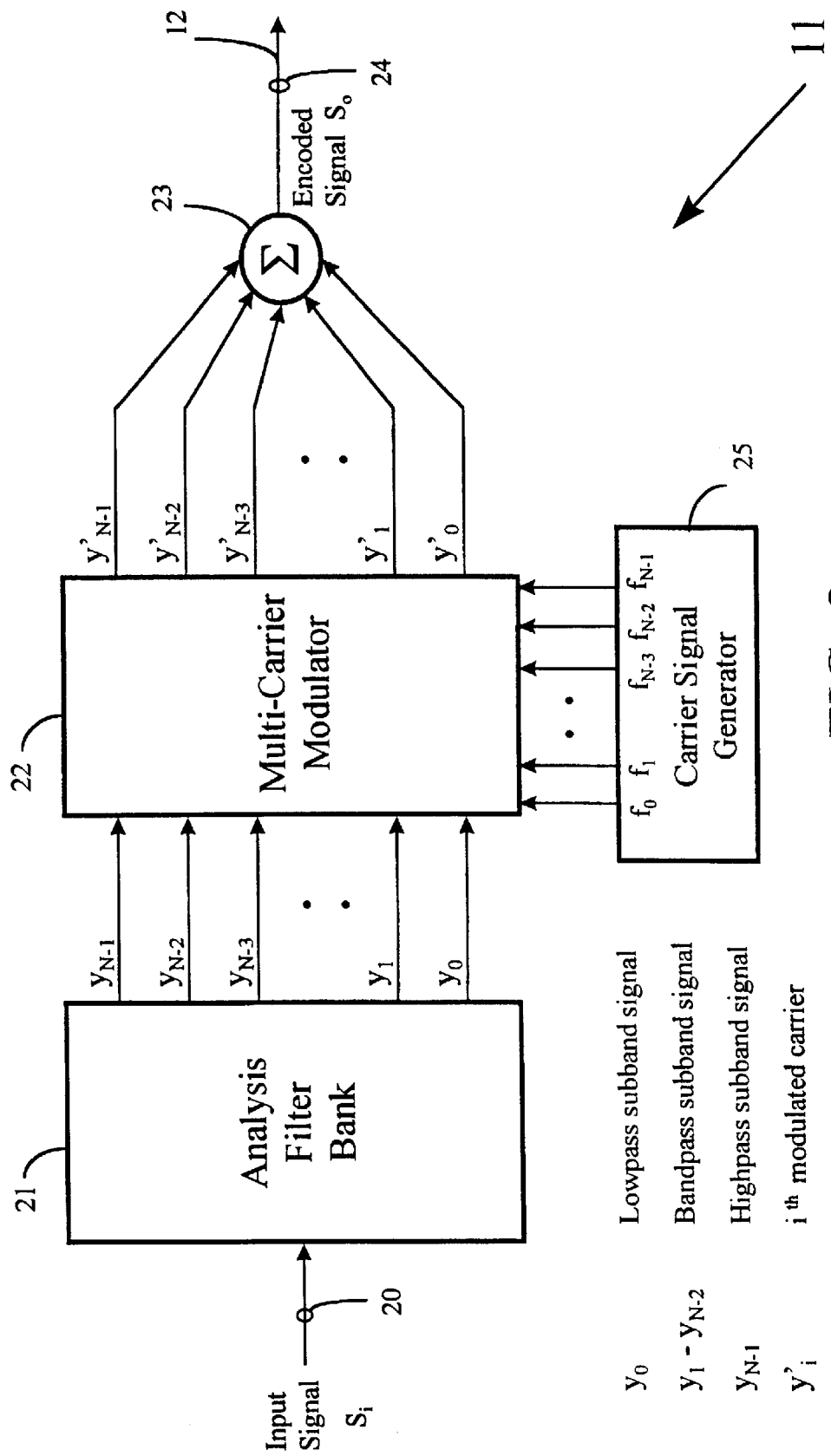
FIG. 2 is a schematic block diagram of an encoder embodying the present invention.

A first embodiment of the encoder 11 is illustrated in more detail in FIG. 2. The input signal $S_1$ is applied via an input port 20 to analysis filter bank 21 which decomposes it into sub-bands to generate/extract a lowpass sub-band signal $y_0$, bandpass sub-band signals $y_1$–$y_{N-2}$ and a highpass sub-band signal $y_{N-1}$. The sub-band signals $y_1$–$y_{N-2}$ are supplied to a multi-carrier modulator 22 which uses each sub-band signal to modulate a respective carrier of a selected frequency, as will be explained later. The lowpass sub-band signal $y_0$ contains more low frequency components than the other sub-band signal, and is used to modulate a low frequency carrier $f_0$. The bandpass sub-band signals $y_1$–$y_{N-2}$ and highpass sub-band signal $y_{N-1}$ have more high frequency components than the lowpass wavelet signal $y_0$ and are therefore used to modulate higher frequency carrier signals $f_1$–$f_{N-1}$, respectively, of which the frequencies increase from $f_1$ to $f_{N-1}$. The modulated carrier signals $y'_0$–$y'_{N-1}$ are combined by summer 23 to form the encoded output signal $S_o$ which is transmitted via output port 24 to transmission medium 12 for transmission to decoder 13 (FIG. 1).

Figure 3:
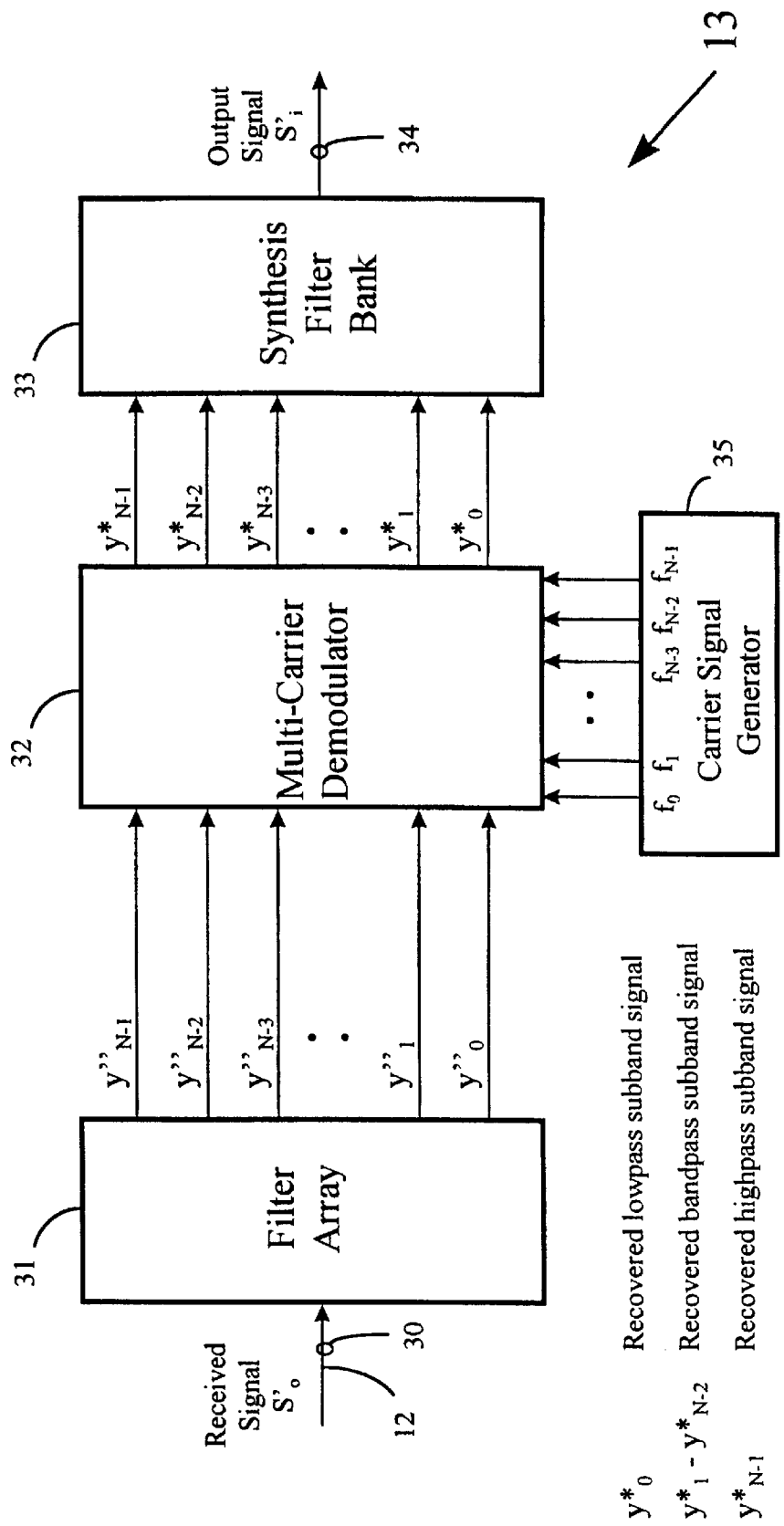
FIG. 3 is a schematic block diagram of a corresponding decoder for signals from the encoder of FIG. 1.

A suitable decoder 13, for decoding the encoded output signal, will now be described with reference to FIG. 3. After passing through the transmission medium 12, the transmitted signal $S_o$ may be attenuated and contain noise. Hence, as received by the decoder at port 30 it is identified as received signal $S'_o$ (the prime signifying that it is not identical to enclosed signal $S_o$) and supplied to a filter array 31. Each of the filters in the array 31 corresponds to one of the frequencies $f_0$–$f_{N-1}$ of the multi-carrier modulator 22 (FIG. 2) and recovers the corresponding modulated carrier signals. The recovered modulated carrier signals $y''_0$–$y''_{N-1}$ separated by the array then are demodulated by a multi-carrier demodulator 32 to recover the lowpass, bandpass and highpass sub-band signals $y^*_0$–$y^*_{N-1}$ corresponding to sub-band signals $y_0$–$y_{(N-1)}$, respectively, in the encoder 11. The recovered sub-band signals are supplied to synthesis filter bank 33 which, operating in a complementary and INVERSE manner to analysis filter bank 21, produces an output signal $S'_1$ which should closely resemble the input signal $S_i$ in FIG. 2, and supplies it to signal destination 14 via output port 34. Usually, the recovered signal $S'_1$ will be equalized using an adaptive equalizer to compensate for distortion and noise introduced by the channel 12.

It should be noted that the highpass subband signal $y_{N-1}$ and some of sub-band signals $y_0$–$y_{N-2}$ in FIG. 2 may not need to be transmitted, if they contain little transmission power as compared with other sub-band signals. When these sub-band signals are not transmitted, the synthesis filter bank 33 shown. in FIG. 3 will insert zeros in place of the missing sub-band signals. The reconstructed signal $S'_1$ would then be only a close approximation to the original input signal $S_1$. Generally, the more sub-bands used, the better the approximation.

Preferably, analysis filter 21 is a multiresolution filter bank which implements a Discrete Wavelet Transform (DWT). In order to facilitate a better understanding of the embodiments which use DWT, a brief introduction to discrete wavelet transforms (DWT) will first be given. DWT represents an arbitrary square integrable function as the superposition of a family of basis functions called wavelets. A family of wavelet basis functions can be generated by translating and dilating the mother wavelet corresponding to the family. The DWT coefficients can be obtained by taking the inner product between the input signal and the wavelet functions. Since the basis functions are translated and dilated versions of each other, a simpler algorithm, known as Mallat's tree algorithm or pyramid algorithm, has been proposed by S. G. Mallat in "A theory of multiresolution signal decomposition: the wavelet representations", *IEEE Trans. on Pattern Recognition and Machine Intelligence,* Vol. 11, No. 7, July 1989. In this algorithm, the DWT coefficients of one stage can be calculated from the DWT coefficients of the previous stage, which is expressed as follows:

$$W_L(n, j) = \sum_m W_L(m, j-1)h(m-2n) \quad (1a)$$

$$W_H(n, j) = \sum_m W_L(m, j-1)g(m-2n) \quad (1b)$$

where W(p,q) is the p-th wavelet coefficient at the q-th stage, and h(n) and g(n) are the dilation coefficients corresponding to the scaling and wavelet functions, respectively.

For computing the DWT coefficients of the discrete-time data, it is assumed that the input data represents the DWT coefficients of a high resolution stage. Equations 1a and 1b can then be used for obtaining DWT coefficients of subsequent stages. In practice, this decomposition is performed only for a few stages. It should be noted that the dilation coefficients h(n) represent a lowpass filter, whereas the coefficients g(n) represent a highpass filter. Hence, DWT extracts information from the signal at different scales. The first stage of wavelet decomposition extracts the details of the signal (high frequency components) while the second and all subsequent stages of wavelet decompositions extract progressively coarser information (lower frequency components). It should be noted that compactly supported wavelets can be generated by a perfect-reconstruction two-channel filter banks with a so-called octave-band tree-structured architecture. Orthogonal and biorthogonal filter banks can be used to generate wavelets in these system. A three stage octave-band tree structure for Discrete Wavelet Transformation will now be described with reference to FIGS. 4A and 4B, in which the same components in the different stages have the same reference number but with the suffix letter of the stage.

Figure 4A:
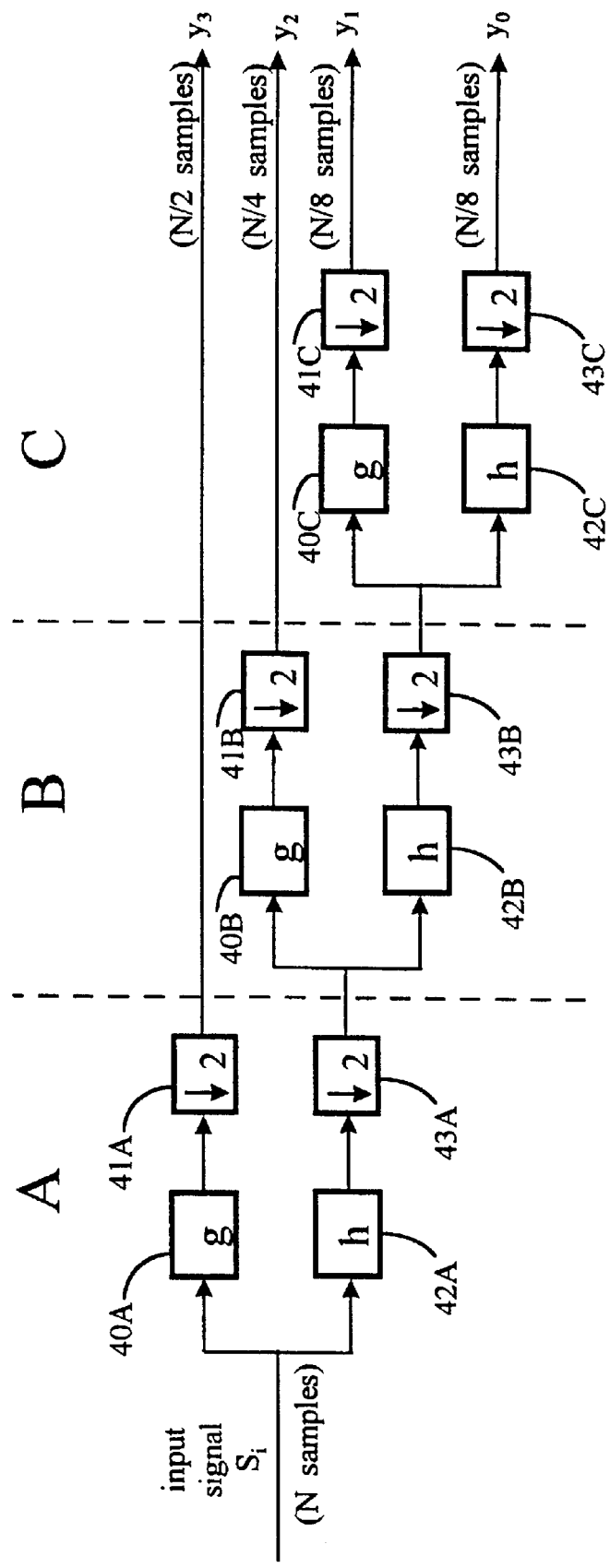
FIG. 4A illustrates three-stage Discrete Wavelet Transform decomposition using a pyramid algorithm to provide sub-band signals.

Referring to FIG. 4A, the three decomposition stages A, B and C have different sampling rates. Each of the three stages A, B and C comprises a highpass filter 40 in series with a downsampler 41, and a lowpass filter 42 in series with a downsampler 43. The cut-off frequency of each lowpass filter 42 is substantially the same as the cut-off frequency of the associated highpass filter 40. In each stage, the cut-off frequency is equal to one quarter of the sampling rate for that stage.

The N samples of input signal $S_i$ are supplied in common to the inputs of highpass filter 40A and lowpass filter 42A. The corresponding N high frequency samples from highpass filter 40A are downsampled by a factor of 2 by downsampler 41A and the resulting N/2 samples supplied to the output as the highpass wavelet $y_3$. The N low frequency samples from lowpass filter 42A are downsampled by a factor of 2 by downsampler 43A and the resulting N/2 samples supplied to stage B where the same procedure is repeated. In stage B, the N/2 higher frequency samples from highpass filter 40B are downsampled by downsampler 41B and the resulting N/4 samples supplied to the output as bandpass wavelet $y_2$. The other N/2 samples from lowpass filter 42B are downsampled by downsampler 43B and the resulting N/4 samples are supplied to the third stage C, in which highpass filter 40C and downsampler 41C process them in like manner to provide at the output N/8 samples as bandpass wavelet $y_1$. The other N/4 samples from lowpass filter 42C are downsampled by downsampler 43C to give N/8 samples and supplies them to the output as low-pass wavelet $y_0$.

It should be noted that, if the input signal segment comprises, for example, 1024 samples or data points, wavelets $y_0$ and $y_1$ comprise only 128 samples, wavelet $y_2$ comprises 256 samples and wavelet $y_3$ comprises 512 samples.

Instead of the octave-band structure of FIG. 4A, a set of one lowpass, two bandpass filters and one highpass filter could be used, in parallel, with different downsampling rates.

Figure 4B:
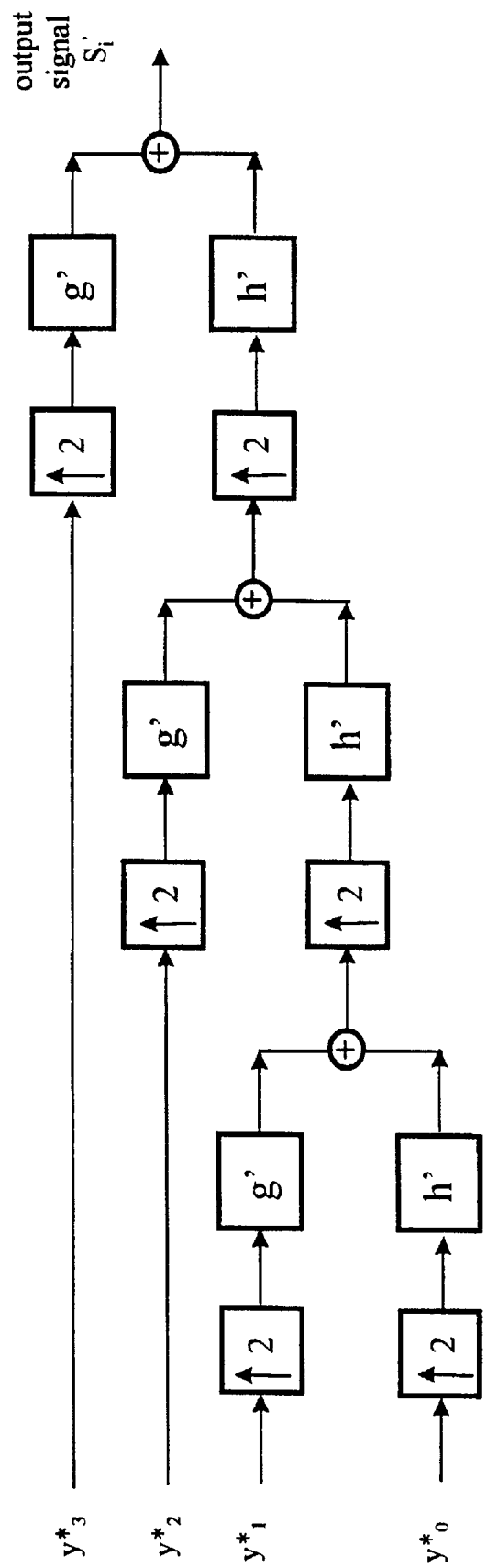
FIG. 4B illustrates three-stage synthesis of an output signal from the sub-band signals of FIG. 4A.

Referring now to FIG. 4B, in order to reconstruct the original input signal, the DWT wavelet signals are upsampled and passed through another set of lowpass and highpass filters, the operation being expressed as:

$$W_L(n, j) = \sum_k W_L(k, j+1)h'(n-2k) + \sum_l W_H(l, j+1)g'(n-2l) \quad (2)$$

where h'(n) and g'(n) are, respectively, the lowpass and highpass synthesis filters corresponding to the mother wavelet. It is observed from equation 2 that j-th level DWT wavelet signals can be obtained from (j+1)-th level DWT coefficients.

Compactly supported wavelets are generally used in various applications. Table I lists a few orthonormal wavelet filter coefficients h(n) that are popular in various applications, as disclosed by I. Daubechies, in "Orthonormal bases of compactly supported wavelets", Comm. Pure Appl. Math, Vol. 41, pp. 906–966, 1988. These wavelets have the property of having the maximum number of vanishing moments for a given order, and are known as "Daubechies wavelets".

TABLE I

| Coefficients | Wavelets | |
|---|---|---|
| | Daub-6 | Daub-8 |
| h(0) | 0.332671 | 0.230378 |
| h(1) | 0.806892 | 0.714847 |
| h(2) | 0.459878 | 0.630881 |
| h(3) | −0.135011 | −0.027984 |
| h(4) | −0.085441 | −0.187035 |
| h(5) | 0.035226 | 0.030841 |
| h(6) | | 0.032883 |
| h(7) | | −0.010597 |

An embodiment of the invention in which the higher sub-bands are not transmitted, and which uses discrete wavelet transforms for encoding a digital signal, will now be described with reference to FIG. 5. In the transmitter/encoder 11' of FIG. 5, the input signal $S_i$, is supplied to an input port 20 of analysis filter means comprising an octave-band filter bank 51 for applying Discrete Wavelet Transform as illustrated in FIG. 4A to the signal $S_i$ to generate lowpass sub-band wavelet signal $y_0$, two bandpass sub-band wavelet signals, $y_1$ and $y_2$, and the highpass sub-band wavelet signal $y_3$. In this implementation, only sub-band wavelet signals $y_0$, $y_1$, and $y_2$ will be processed. Highpass sub-band wavelet signal $y_3$ is discarded. Interpolator means 52 interpolates sub-band wavelet signals $y_0$, $y_1$ and $y_2$ by factors 2M, 2M and M, respectively, where M is an integer, typically 8 to 24, such that the three sub-band wavelet signals ($y_0$, $y_1$, and $y_2$) have equal sample rates. Thus, within interpolator 52, the sub-band wavelet signals $y_0$, $y_1$ and $y_2$ are upsampled by upsamplers $53_0$, $53_1$ and $53_2$, respectively, which insert zero value samples at intervals between actual samples. The upsampled signals then are filtered by three Raise-Cosine filters $54_0$, $54_1$ and $54_2$, respectively, which insert at each upsampled "zero" point a sample calculated from actual values of previous samples. The Raise-Cosine filters are preferred so as to minimize intersymbol interference. The three interpolated sub-band wavelet signals are supplied to double side-band (DSB) multi-carrier modulator 55 which uses them to modulate three separate carrier signals $f_0$, $f_1$ and $f_2$, where $f_0 < f_1 < f_2$ provided by carrier generator 56. The modulator 55 comprises multipliers $57_0$, $57_1$ and $57_2$ which multiply the carrier signals $f_0$, $f_1$ and $f_2$ by the three interpolated wavelet signals $y''_0$, $y''_1$ and $y''_2$, respectively. The resulting three modulated carrier signals $y'_0$, $y'_1$ and $y'_2$ are added together by a summer 58 to form the encoded signal $S_o$ for transmission by way of port 24 to transmission medium 12.

Figure 6:
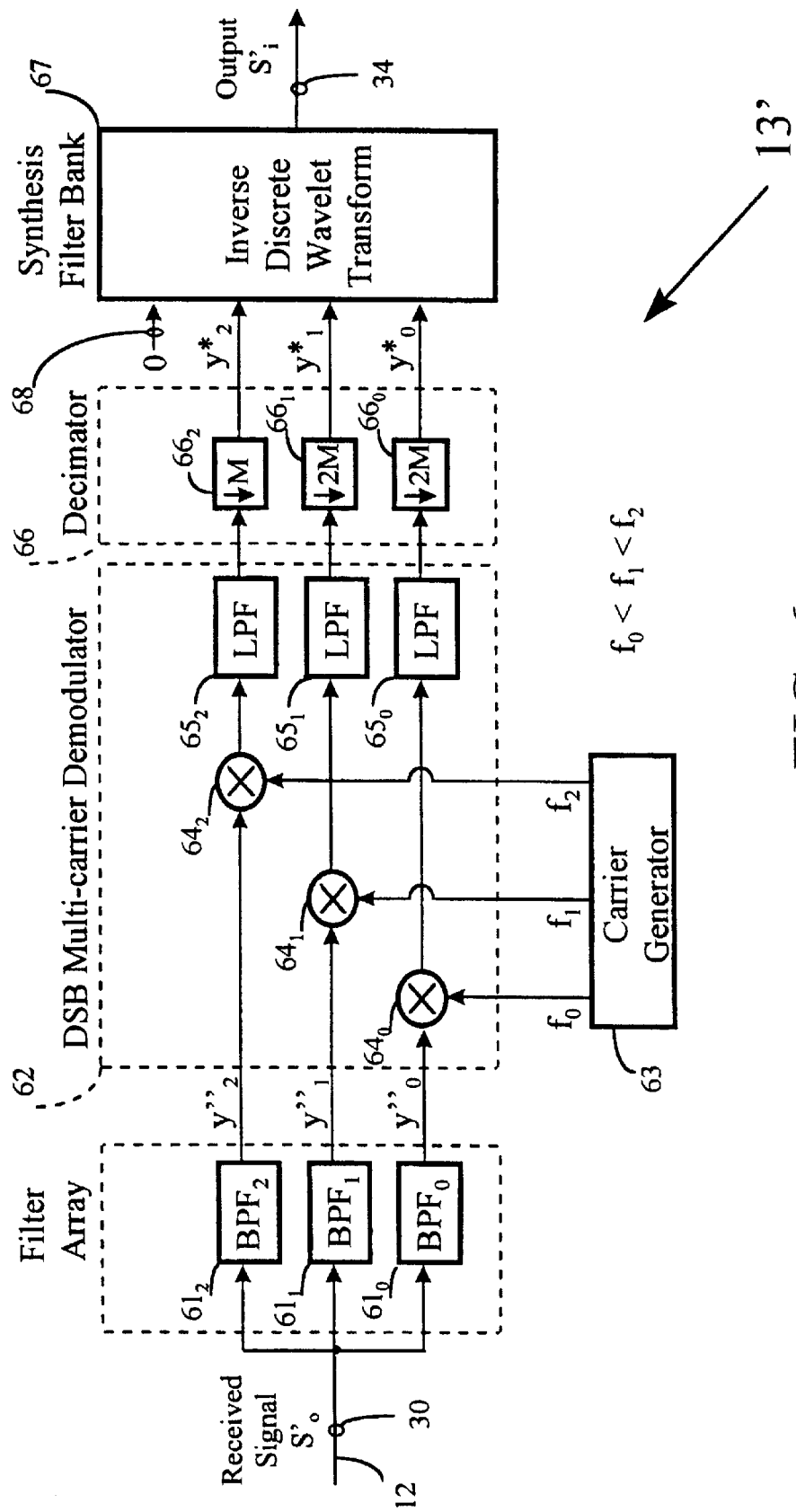
FIG. 6 is a block schematic diagram of a decoder using three sub-bands and carriers. for use with the encoder of FIG. 5.

At the corresponding decoder 13' shown in FIG. 6, the signal $S'_o$ received at port 30 is supplied to each of three bandpass filters $61_0$, $61_1$ and $61_2$ which recover the modulated carrier signals $y''_0$, $y''_1$ and $y''_2$. The recovered modulated carrier signals $y''_0$, $y''_1$ and $y''_2$ are demodulated using multi-carrier double sideband (DSB) demodulator 62. A carrier generator 63 generates carrier signals having frequencies $f_0$, $f_1$ and $f_2$, which are supplied to multipliers $64_0$, $64_1$ and $64_2$ within the demodulator 62 and which multiply the carrier signals $f_0$, $f_1$ and $f_2$ by the recovered modulated carrier signals $y''_0$, $y''_1$ and $y''_2$, respectively. The DSB demodulator 62 comprises lowpass filters $65_0$, $65_1$, and $65_2$ for filtering the outputs of the multipliers $64_0$, $64_1$ and $64_2$, respectively, as is usual in a DSB demodulator.

The demodulated signals from the filters $65_0$, $65_1$ and $65_2$ are decimated by 2M, 2M and M, respectively, by decimators $66_0$, $66_1$ and $66_2$ of a decimator unit 66 and the resulting recovered sub-band signals $y^*_0$, $y^*_1$ and $y^*_2$ each supplied to a corresponding one of four inputs of a synthesis filter bank 67 which applies to them an Inverse Discrete Wavelet Transform (IDWT) as illustrated in FIG. 4B to recover the signal $S'_i$ which corresponds to the input signal $S_i$. The highpass sub-band wavelet signal $y_3$, which was not transmitted, is replaced by a "zero" signal at the corresponding "highest" frequency input 68 of the synthesis filter bank 67. The resulting output signal $S'_i$ from the synthesis filter bank 67 is the decoder output signal supplied via output port 34, and is a close approximation of the input signal $S_i$ supplied to the encoder 11' of FIG. 5.

Figure 7A:
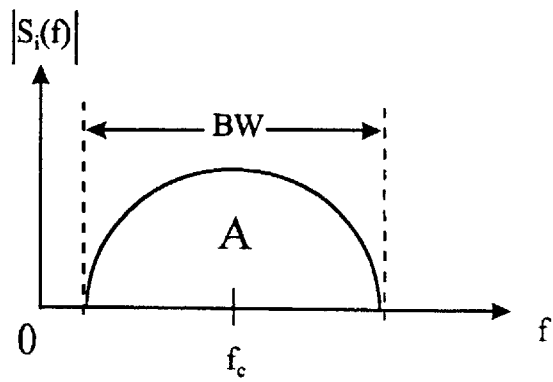
FIGS. 7A, 7B and 7C illustrate the frequency spectrums of an input signal, and three sub-band signals before and after multi-carrier SSB modulation.
Figure 7B:
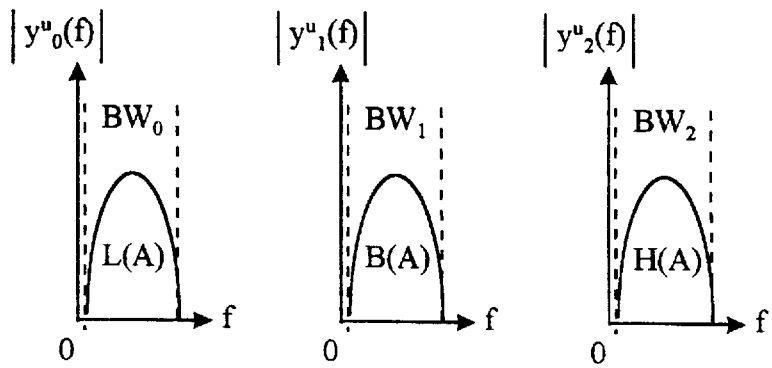
Figure 7C:
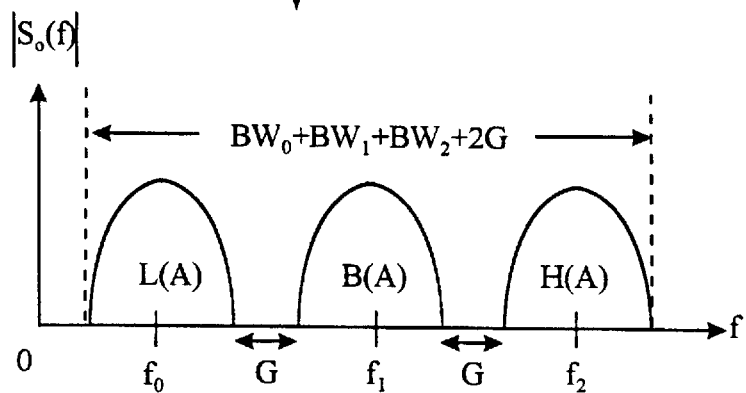

The bandwidth of the transmitted signal $S_o$ is wider than that of the original signal $S_i$ because each sub-band has upper and lower sidebands. A bandwidth reduction can be achieved by using Single Sideband (SSB) modulation. To do so, the encoder 11' of FIG. 5 would be modified by replacing each of the multipliers $57_0$, $57_1$ and $57_2$ by a SSB modulator. FIGS. 7A, 7B and 7C illustrate operation of the encoder using very simplified signals and, for convenience of illustration, SSB modulation.

FIG. 7A shows the frequency spectrum of a much-simplified input signal $S_i$ occupying a bandwidth BW centered at frequency $f_c$. As shown in FIG. 7B, after analysis filtering and interpolation, the input signal $S_i$ has been partitioned into three interpolated sub-band signals, $y''_0$, $y''_1$ and $y''_2$. It should be noted that, for complex input signals, the sub-band signals $y_0$, $y_1$ and $y_2$ prior to interpolation have a very wide spectrum. After upsampling and filtering by the interpolator 52 (FIG. 5), sub-band signals $y''_0$, $y''_1$ and $y''_2$ each have a frequency spectrum that is much narrower than the frequency spectrum of the original signal $S_i$.

Following modulation by the DSB multi-carrier modulation means 55, the bandwidths $BW_0$, $BW_1$, and $BW_2$ of the corresponding modulated carriers $y'_0$, $y'_1$ and $y'_2$ are determined by the sampling rate of the input signal $S_i$. The total bandwidth $BW_0 + BW_1 + BW_2 + 2G$ may be greater than the bandwidth BW if all sub-bands are used, but may be less if only two are used. The output signal $S_o$ from the summing means 58 has a spectrum which, as shown in FIG. 7C, has three lobes, namely a lower frequency lobe centered at frequency $f_0$, a middle frequency lobe centered at frequency $f_1$ and an upper frequency lobe centered at frequency $f_2$. The three lobes are separated from each other by two guard bands G to avoid interference and ensure that each carries information for its own sub-band only.

Figure 5:
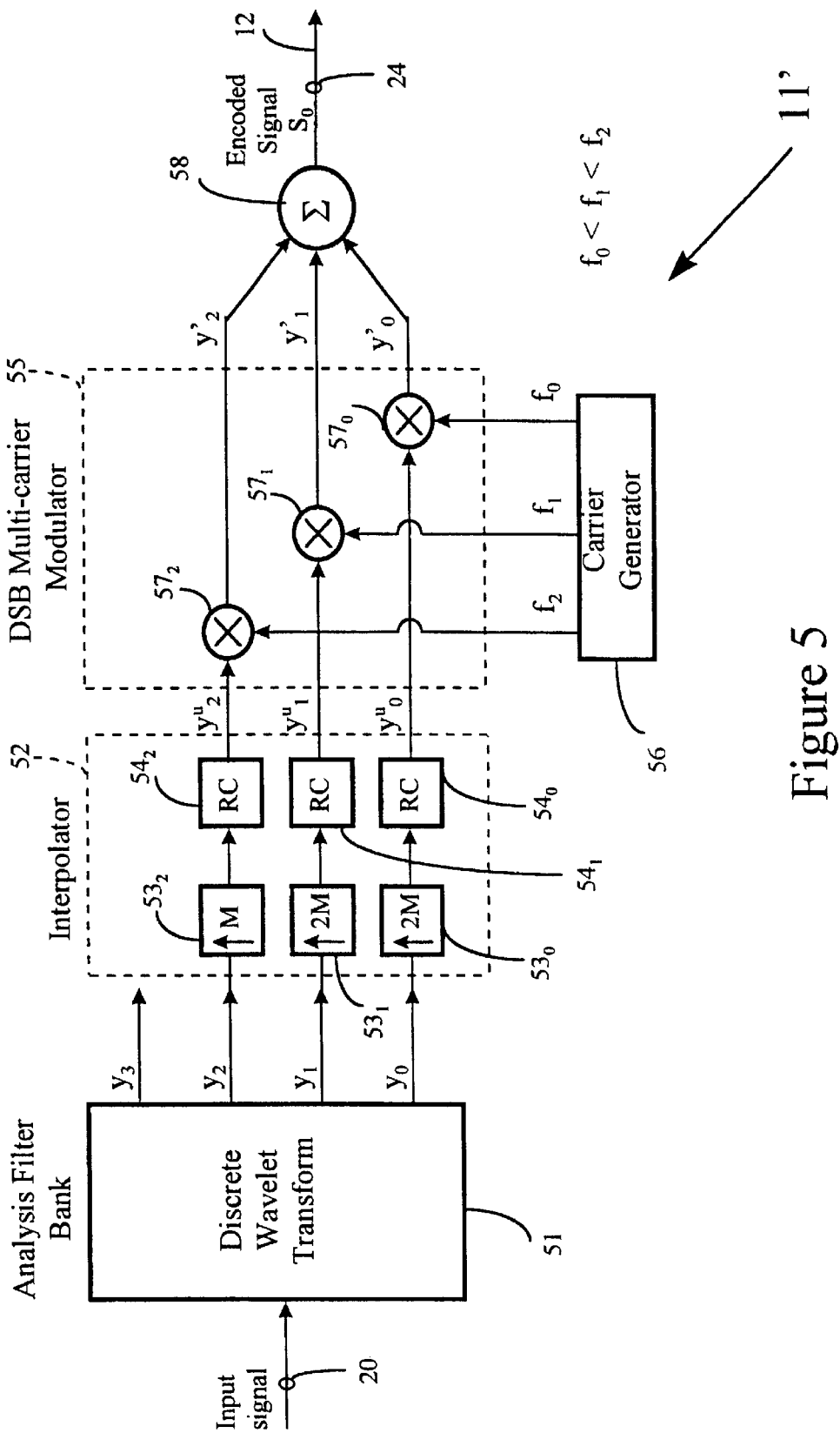
FIG. 5 is a block schematic diagram of an encoder using a sub-band analysis filter and Double Sideband amplitude modulation with three sub-bands and corresponding carriers.
Figure 8:
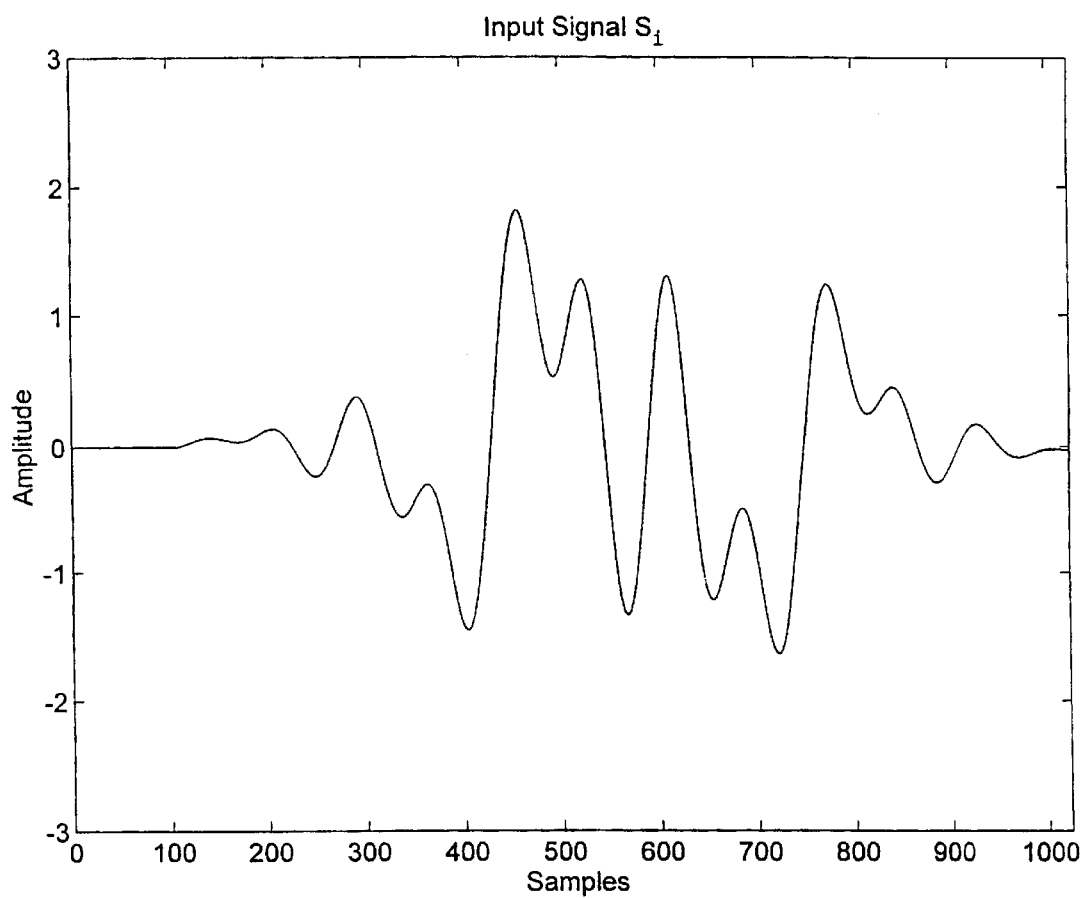
FIG. 8 illustrates, as an example, a very simple input signal $S_i$ applied to the encoder of FIG. 5.
Figure 9A:
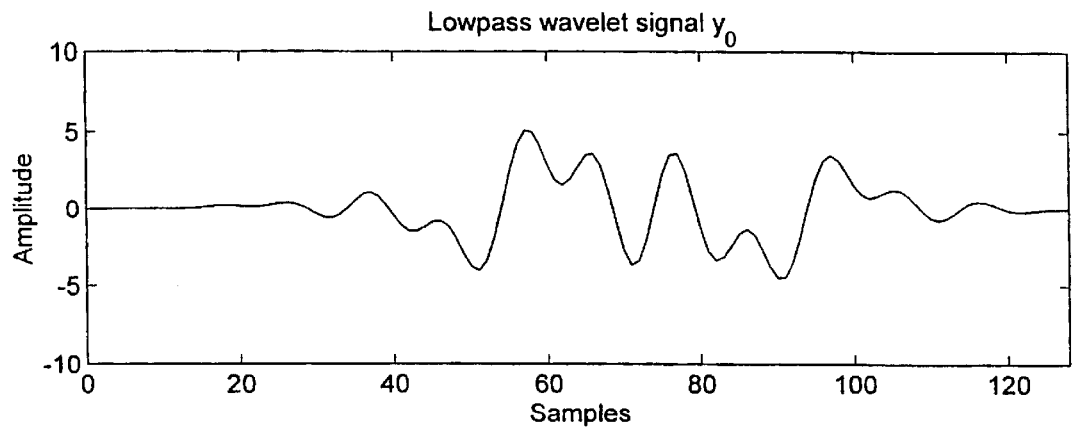
FIGS. 9A, 9B, 9C and 9D illustrate the sub-band wavelet signals $y_0$, $y_1$, $y_2$ and $y_3$ produced by analysis filtering of the input signal $S_i$ of FIG. 8.
Figure 9B:
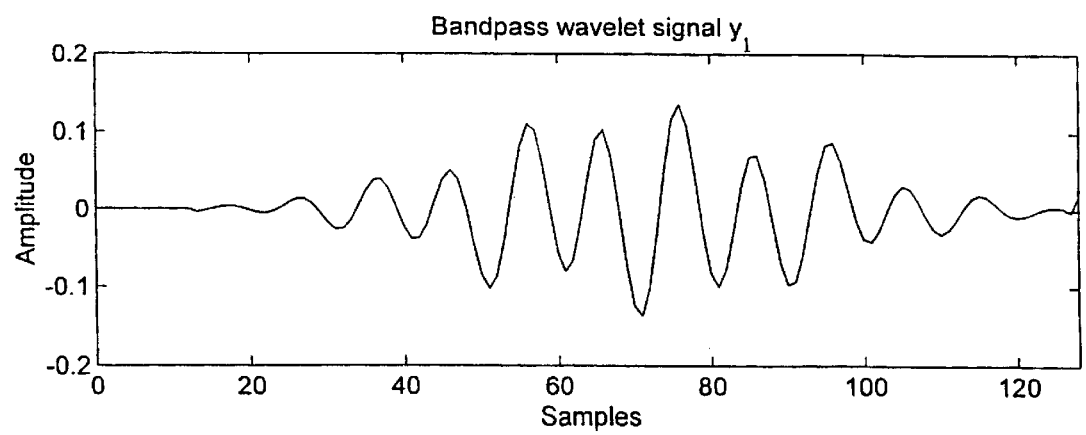
Figure 9C:
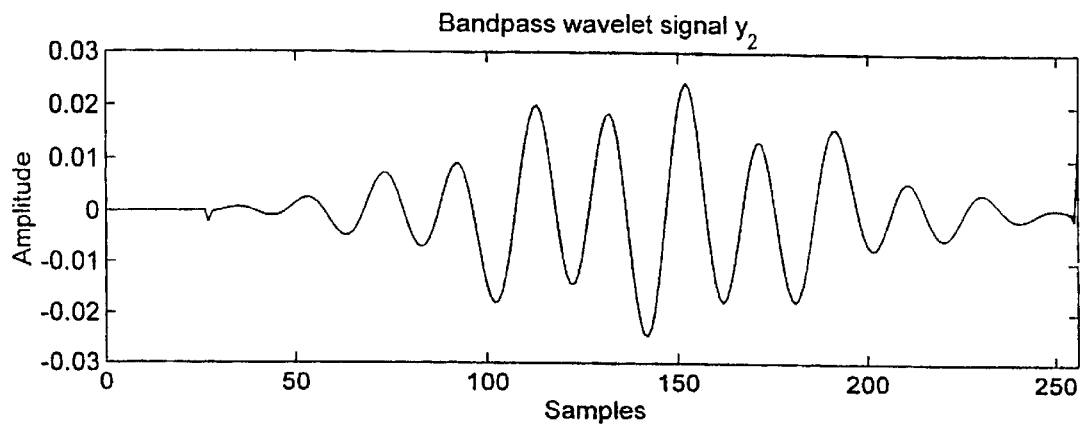
Figure 9D:
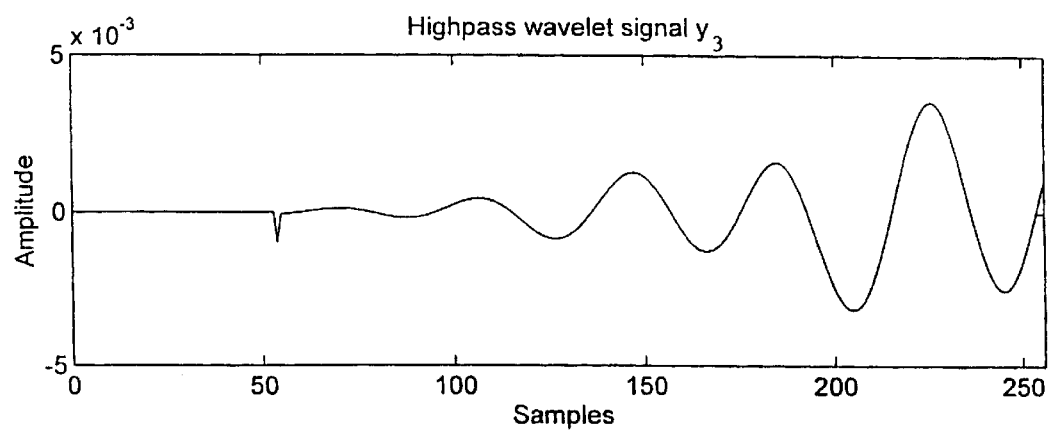
Figure 10A:
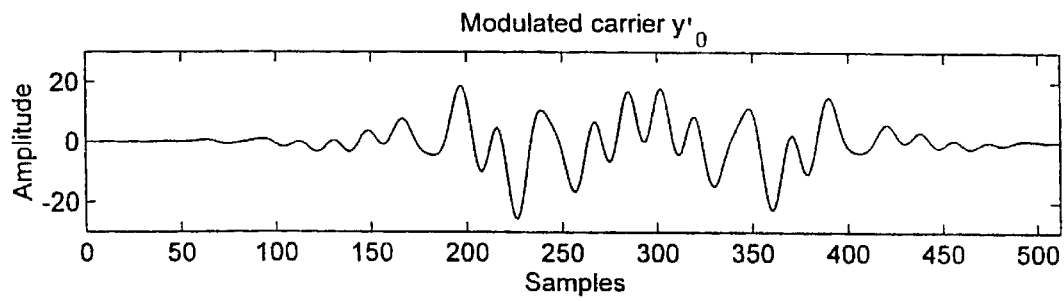
FIGS. 10A, 10B and 10C illustrate modulated carrier signals $y'_0$, $y'_1$ and $y'_2$ modulated by sub-band wavelet signals $y_0$, $y_1$ and $y_2$, respectively.
Figure 10B:
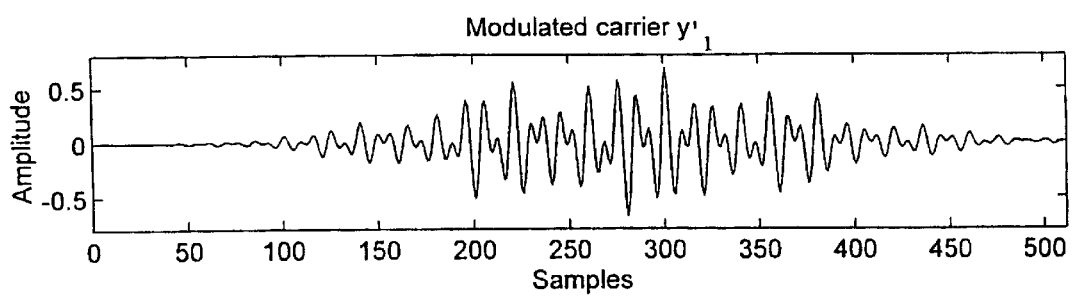
Figure 10C:
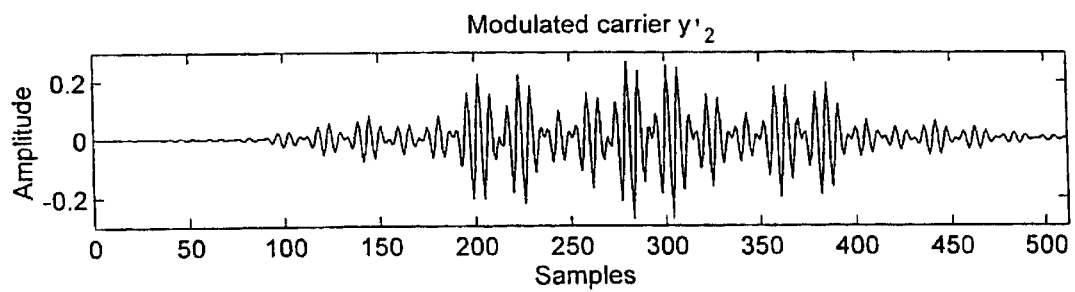
Figure 11:
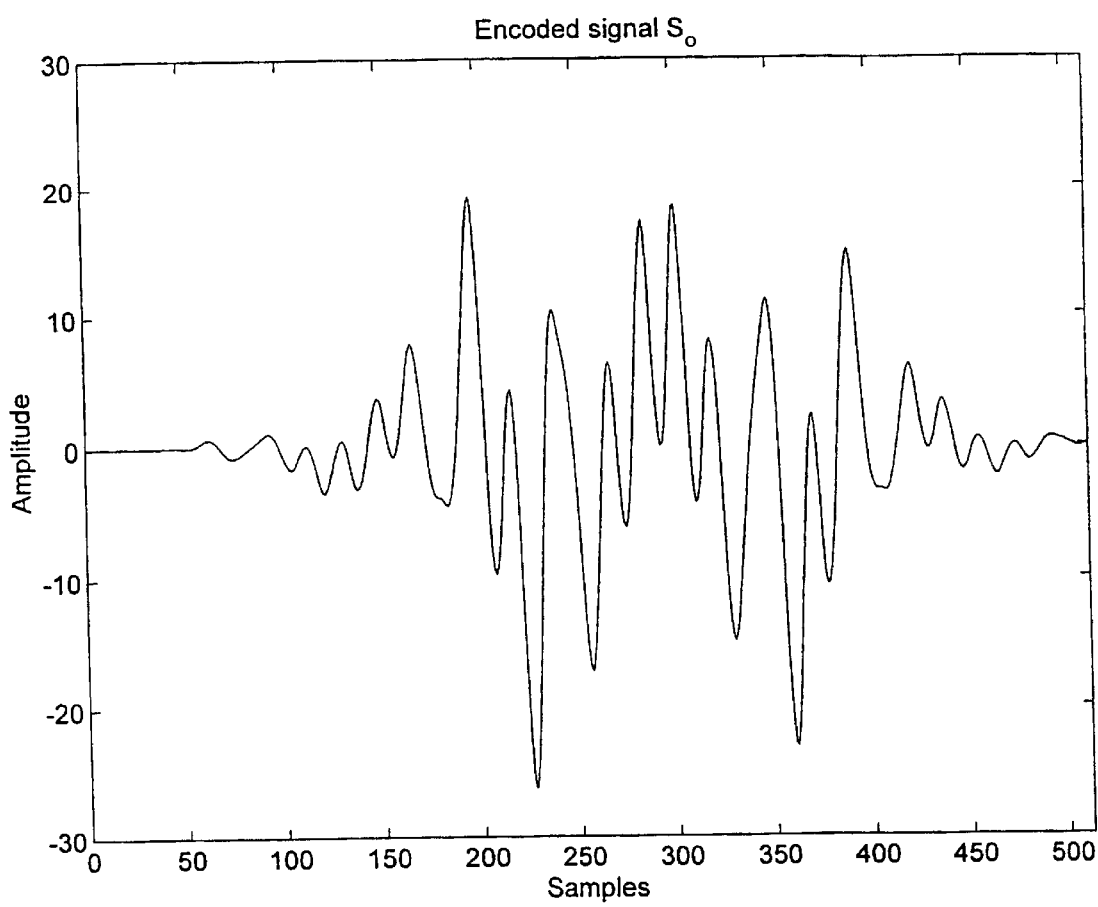
FIG. 11 illustrates the encoded/transmitted signal $S_o$.
Figure 12:
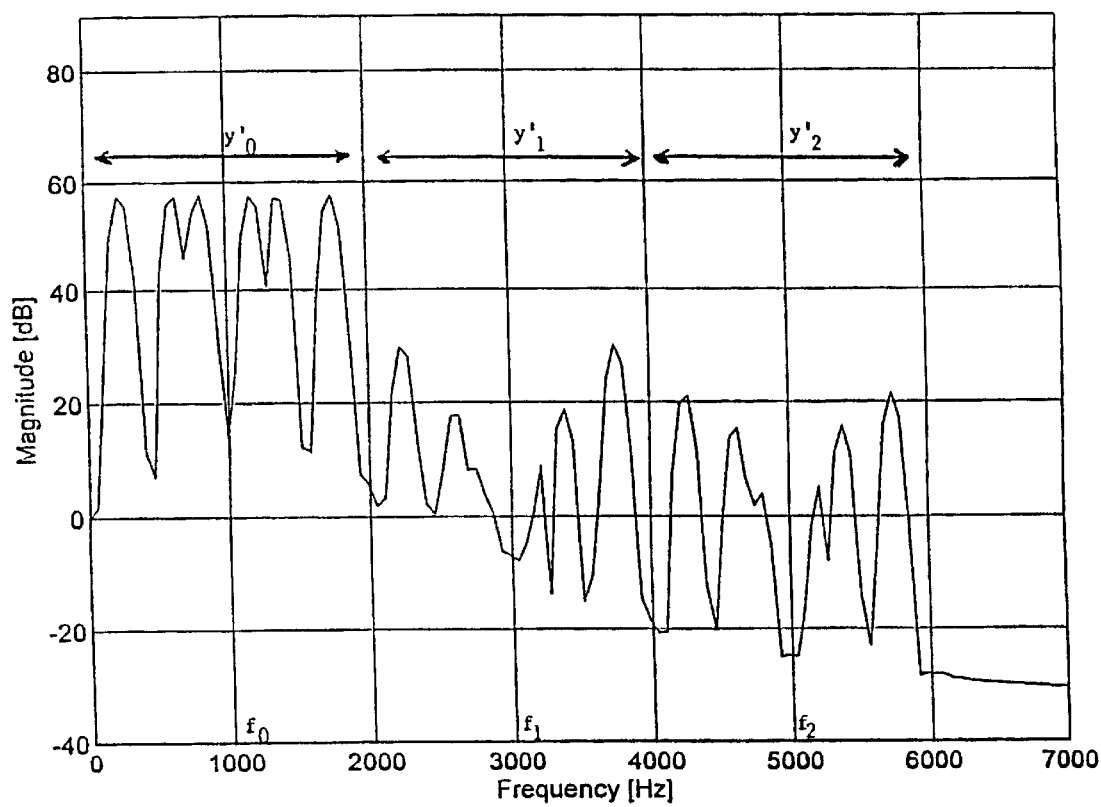
FIG. 12 illustrates the power spectrum of the transmitted signal $S_o$.

Simplified versions of the input signal $S_i$, sub-band wavelet signals $y_0$, $y_1$, $y_2$ and $y_3$, sub-band wavelet modulated carriers $y'_0$, $y'_1$ and $y'_2$, and the transmitted signal $S_o$, which are similar in the encoders of FIGS. 2 and 5, are shown in FIGS. 8–10. FIG. 8 shows the simplified input signal $S_o$, (which is not the same as that illustrated in FIG. 7A). FIGS. 9A, 9B, 9C and 9D illustrate the sub-band wavelet signals $y_0$, $y_1$, $y_2$ and $y_3$ obtained by DWT processing of the input signal $S_i$. FIGS. 10A, 10B and 10C illustrate the corresponding modulated carrier signals $y'_0$, $y'_1$ and $y'_2$ obtained by modulating the carrier signals $f_0$, $f_1$, and $f_2$ with the sub-band wavelet signals $y_0$, $y_1$ and $y_2$, respectively. Because the waveform of the simplified input signal is so smooth, the wavelet signal $y_2$ is interpolated by a factor of 2 only, and the wavelet signal $y_0$ and $y_1$ by a factor of 4 only. This is, of course, for illustration only; in practice the interpolator may typically range from 1:8 to 1:24. FIG. 11 shows the encoded signal $S_o$ and FIG. 12 shows its frequency spectrum which comprises the spectrum components of $y'_0$, $y'_1$ and $y'_2$ centered at frequencies of 1000 Hertz, 3000 Hertz and 5000 Hertz, respectively. for a message rate of 750 Hertz. The asymmetric distribution of transmission power between the lower and high frequency carriers should be noted. It should be appreciated that these simplified signals are for illustration only and that real signals would be much more complex.

Figure 13A:
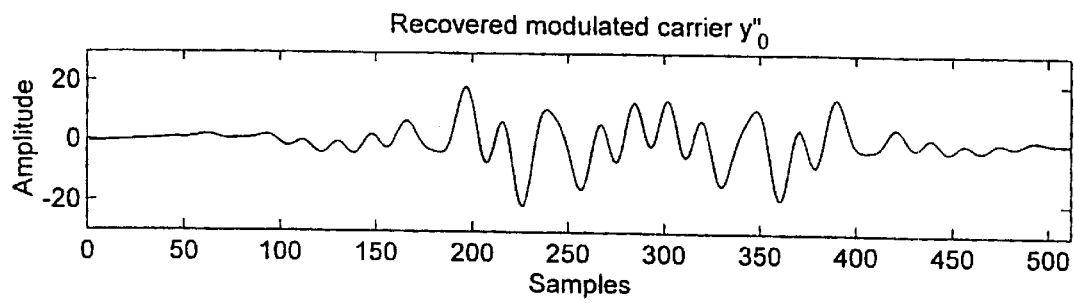
FIGS. 13A, 13B and 13C illustrate the recovered wavelet modulated carriers, $y''_0$, $y''_1$ and $y''_2$
Figure 13B:
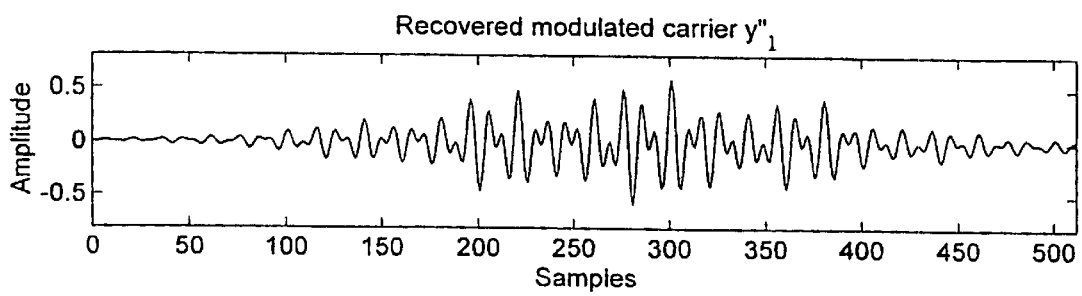
Figure 13C:
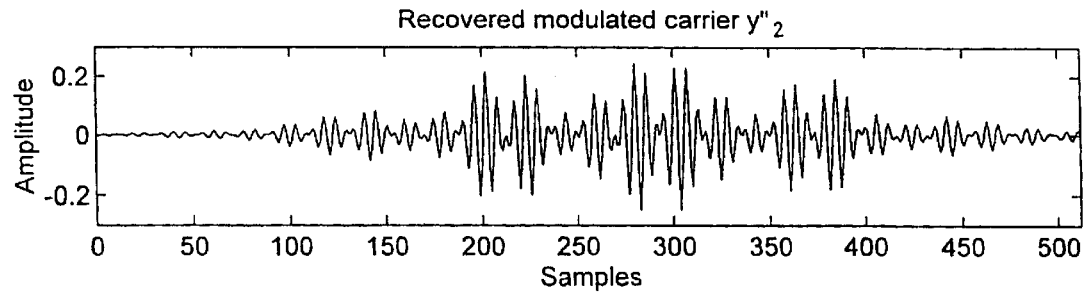
Figure 14A:
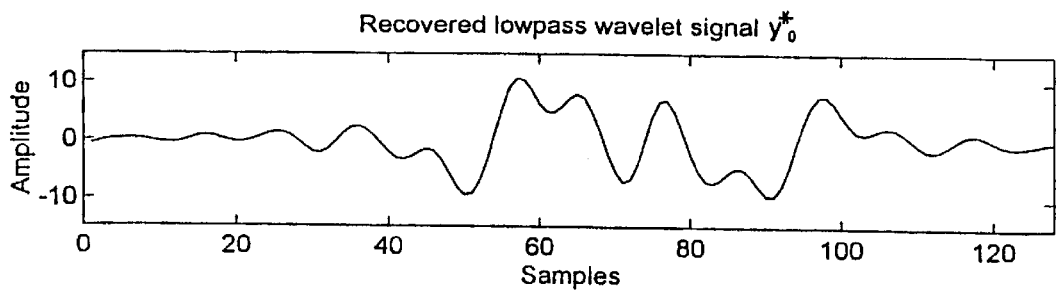
FIG. 14A, 14B and 14C illustrate the recovered wavelet signals $y^*_0$, $y^*_1$ and $y^*_2$.
Figure 14B:
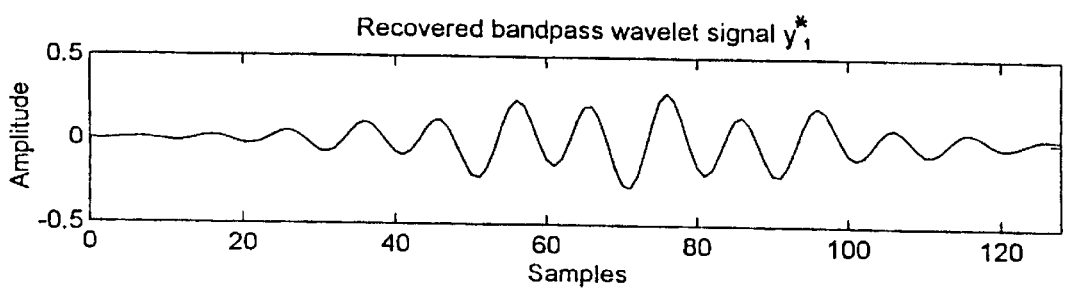
Figure 14C:
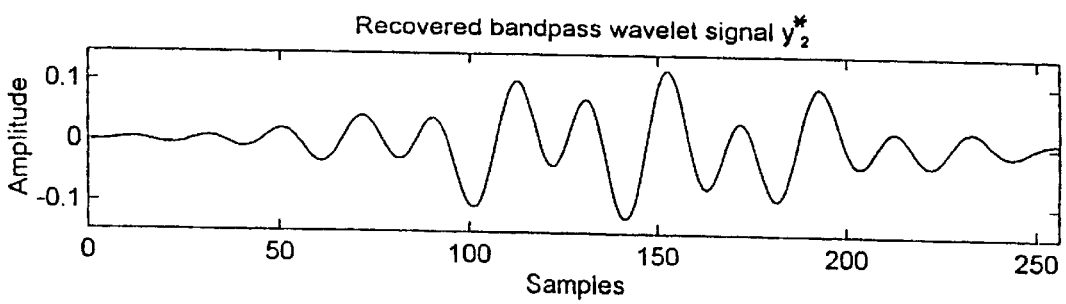
Figure 15:
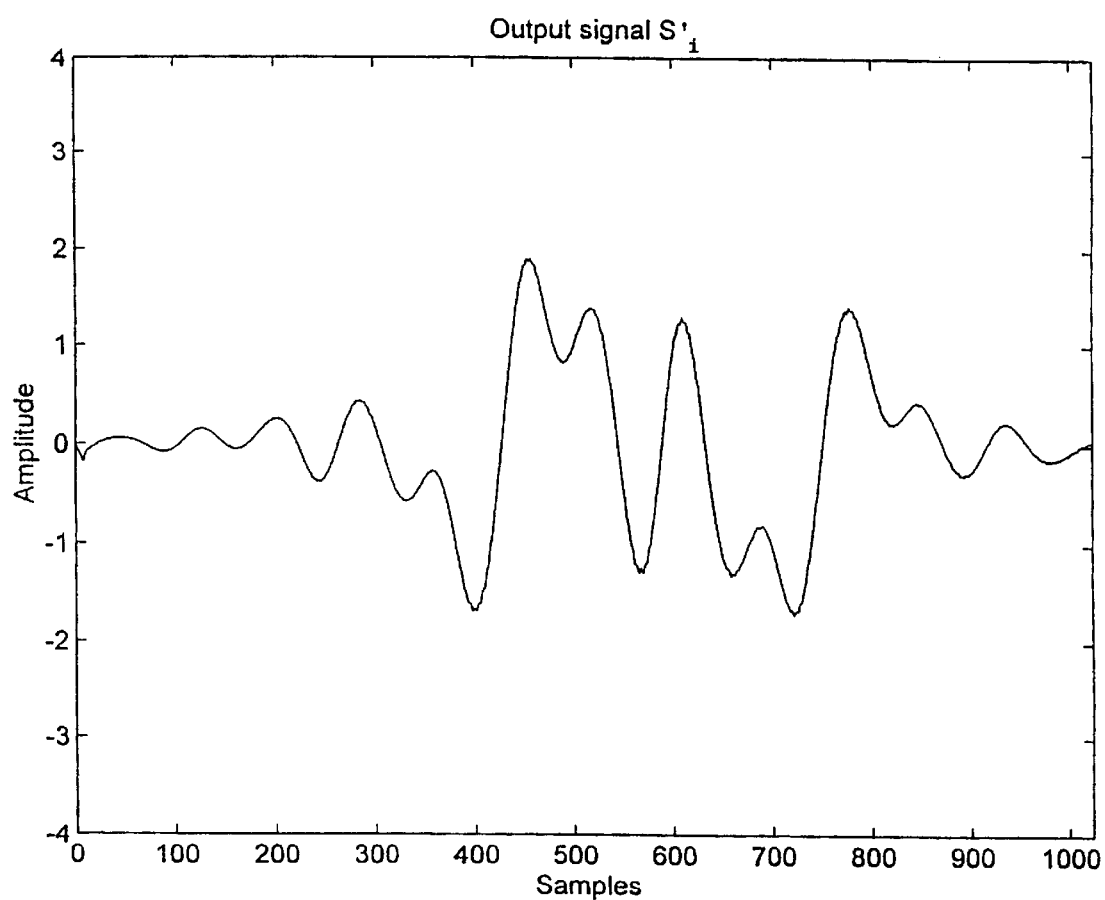
FIG. 15 illustrates the reconstructed signal.

FIGS. 13A, 13B and 13C illustrate the recovered modulated carrier signals $y''_0$, $y''_1$, and $y''_2$, and FIGS. 14A, 14B and 14C illustrate the recovered sub-band wavelet signals $y^*_0$, $y^*_1$ and $y^*_2$. Finally, FIG. 15 illustrates the reconstructed signal $S'_i$ which can be seen to be a close approximation of the input signal $S_i$ shown in FIG. 8.

In the above-described embodiment, the highpass sub-band signal $y_3$ is not used, on the grounds that it probably contains negligible energy. If it has significant energy, however, it could be used, and the encoder and decoder modified appropriately.

While similar implementations using more than two sub-bands and carriers are possible, and might be desirable in some circumstances, for most applications, and especially communication of digital signals via twisted wire subscriber loops, they would be considered complex without significant improvement in performance.

It should be appreciated that other kinds of modulation might be used to modulate the sub-band signals, for example, narrow-band frequency modulation, and so on.

It should also be appreciated that the signal source 10 and encoder 11 could be parts of a transmitter having other signal processing means. Likewise, the decoder 13 and signal destination 14 could be parts of a corresponding receiver.

Although the above-described embodiments of the invention use three or more of the sub-band signals, it is envisaged that other applications, such as deep space communications, might use only one or two of the wavelets.

Industrial Applicability

An advantage of embodiments of the present invention, which use sub-band signals to modulate carriers, is that transmission is reliable because the impairment of one sub-band in the system would cause the transmission system to degrade only gently. Also, the decoder bandpass filters can be easily designed because there are only a few frequency bands used. Moreover, in applications involving data transmission, data synchronization and clock recovery can be easily achieved in the decoder.

It should be noted that the present invention is not limited to transmission systems but could be used for other purposes to maintain signal integrity despite noise and attenuation. For example, it might be used in recording of the signal on a compact disc or other storage medium. The storage medium can therefore be equated with the transmission medium 12 in FIG. 1. It should be appreciated that the encoders and decoders described herein would probably be implemented by a suitably programmed digital signal processor or as a custom integrated circuit.

Although embodiments of the invention have been described and illustrated in detail, it is to be clearly understood that the same are by way of illustration and example only and not to be taken by way of the limitation, the scope of the present invention being limited only by the appended claims.

REFERENCES

[Mallat 1989] S. G. Mallat, "A theory of multiresolution signal decomposition: the wavelet representation," *IEEE Trans. on Pattern Recognition and Machine Intelligence,* Vol. 11, No. 7, July 1989.

[Daubechies 1988] I. Daubechies, "Orthonormal bases of compactly supported wavelets," *Comm. Pure Appl. Math,* Vol. 41, pp. 906–966, 1988

[Bingham 1990] J. A. C. Bingham, "Multicarrier Modulation for Data Transmission: An Idea Whose Time Has Come", *IEEE Comm. Magazine,* Vol. 28, April 1990.

[Chow 1991] J. S. Chow, J. C. Tu, and J. M. Cioffi, "A Discrete Multitone Transceiver System for HDSL Applications", *IEEE J. on Selected Areas in Comm.,* Vol. 9, No. 6, pp. 895–908, August 1991.

[Tzannes 1993] M. A. Tzannes, M. C. Tzannes and H. L. Resnikoff, "The DWMT: A Multicarrier Transceiver for ADSL using M-band Wavelets", *ANSI Standard Committee T1E1.4 Contribution* 93-067, March 1993.

[Sandberg 1995] S. D. Sandberg, M. A. Tzannes, "Overlapped Discrete Multitone Modulation for High Speed Copper Wire Communications", *IEEE J. on Selected Areas in Comm.,* Vol. 13, No. 9, pp. 1571–1585, December 1995.

What is claimed is:

1. Apparatus comprising an encoder for encoding a digital input signal for transmission or storage and a decoder for decoding such encoded signal to reconstruct the input signal, the encoder comprising analysis filter bank means for analyzing the input signal into a plurality of sub-band signals, each sub-band centered at a respective one of a corresponding plurality of frequencies and the decoder comprising synthesis filter bank means complementary to said analysis filter bank means for producing a decoded signal corresponding to the input signal, wherein:

the encoder comprises
   interpolation means interpolating the plurality of sub-band signals to provide a corresponding plurality of interpolated sub-band signals each occupying the same frequency band as the others; and
   combining means for combining the interpolated sub-band signals to form the encoded signal for transmission or storage;
and the decoder comprises
   means for extracting the interpolated sub-band signals from the received or recorded encoded signal;
   decimator means for decimating each of the plurality of extracted interpolated sub-band signals to remove the interpolated values and applying the decimated signals to the synthesis filter bank means,
   the synthesis filter bank means processing the plurality of decimated sub-band signals to reconstruct said input signal.

2. Apparatus as claimed in claim 1 wherein the interpolation means comprises a plurality of upsamplers each for upsampling intervals between actual values of a respective one of the sub-band signals and a plurality of filter means for determining values between the actual samples of a respective one of the upsampled sub-band signals and inserting such determined values at the appropriate upsampled intervals.

3. Apparatus as claimed in claim 2, wherein the plurality of filter means each comprise a lowpass filter.

4. Apparatus as claimed in claim 3, wherein each lowpass filter means comprises a Raise Cosine filter.

5. Apparatus as claimed in claim 1, wherein, in the encoder the combining means frequency-shifts one or more of the interpolated sub-band signals so that the interpolated sub-band signals occupy different frequency bands in the encoded signal.

6. Apparatus as claimed in claim 1, wherein, in the encoder, the means for combining the sub-band signals to form the encoded signal comprises:
   means for providing a plurality of carrier signals;
   modulation means for using at least some of the interpolated sub-band signals
   each to modulate a respective one of the plurality of carrier signals;
the decoder further comprises:
   means for providing a plurality of carrier signals corresponding to those of said encoder;
and the means for extracting the interpolated sub-band signals from the received signal comprises:
   means for detecting the modulated carrier signals in the received signal; and
   demodulation means for using at least some of the carrier signals to demodulate the extracted modulated carrier signals to extract a plurality of demodulated sub-band signals corresponding to the plurality of sub-band signals.

7. Apparatus as claimed in claim 6, wherein the plurality of carrier signals provided in the encoder have different frequencies, the carrier signals provided in the decoder having the same different frequencies.

8. Apparatus as claimed in claim 1, wherein the analysis filter bank means comprises a uniform filter bank for producing sub-band signals each having the same bandwidth and the synthesis filter bank means comprises a corresponding uniform filter bank.

9. Apparatus as claimed in claim 1, wherein the analysis filter bank means comprises a multiresolution filter bank for providing sub-bands signals having different bandwidths, the interpolation rates are such that the resulting interpolated sub-band signals all have the same rate, the synthesis filter bank means comprises a corresponding multiresolution filter bank, and the decimator decimates non-uniformly and complementarily to the interpolator means.

10. Apparatus as claimed in claim 9, wherein the multiresolution filter bank comprises an octave band filter bank implementing Discrete Wavelet Transform (DWT) to produce a plurality of wavelets as said plurality of sub-band signals, and the synthesis filter bank means comprises an octave band filter bank implementing a corresponding Inverse Discrete Wavelet Transform.

11. Apparatus as claimed in claim 1, wherein, in the encoder the combining means combines a selection of the plurality of interpolated sub-band signals and, in the decoder the synthesis filter bank means substitutes zero-level signals for the sub-band signals not selected.

12. An encoder for use in the apparatus according to claim 1, and for encoding an input signal for transmission or storage, said encoder comprising analysis filter bank means for analyzing the input signal into a plurality of sub-band signals, each sub-band centered at a respective one of a corresponding plurality of frequencies, interpolation means for interpolating the plurality of sub-band signals to provide a corresponding plurality of interpolated sub-band signals each occupying the same frequency band as the others; and combining means for combining the interpolated sub-band signals to form the encoded signal for transmission or storage.

13. An encoder as claimed in claim 12, for use in the apparatus of claim 2 and wherein the interpolation means comprises a plurality of upsamplers, each for interpolating intervals between actual values of a respective one of the sub-band signals and a plurality of filter means each for determining values between the actual samples of a respective one of the upsampled sub-band signals and inserting such determined values at the appropriate intervals.

14. An encoder as claimed in claim 13, wherein the plurality of filter means each comprise a lowpass filter means.

15. An encoder as claimed in claim 14, for use in the apparatus of claim 3 and wherein each lowpass filter means comprises a Raise Cosine filter.

16. An encoder as claimed in claim 12, wherein the combining means frequency-shifts one or more of the interpolated sub-band signals so that the interpolated sub-band signals occupy different frequency bands in the encoded signal.

17. An encoder as claimed in claim 12, wherein the means for combining the sub-band signals to form the encoded signal comprises:

means for providing a plurality of carrier signals; and modulation means for using at least some of the interpolated sub-band signals each to modulate a respective one of the plurality of carrier signals.

18. An encoder as claimed in claim 17, wherein the plurality of carrier signals have different frequencies.

19. An encoder as claimed in claim 12, for use in the apparatus of claim 8 and wherein the analysis filter bank means comprises a uniform filter bank for producing sub-bands each having the same bandwidth.

20. An encoder as claimed in claim 12, for use in the apparatus of claim 9 and wherein the analysis filter bank means comprises a multiresolution filter bank for providing sub-bands having different bandwidths, and the interpolation rate is such that the resulting interpolated sub-band signals all have the same rate.

21. An encoder as claimed in claim 20, for use in the apparatus of claim 10 and wherein the multiresolution filter bank comprises an octave band filter bank implementing Discrete Wavelet Transform (DWT) to produce a plurality of wavelets as said plurality of sub-band signals.

22. An encoder as claimed in claim 12, for use in the apparatus of claim 11 and wherein the combining means combines a selection of the plurality of interpolated sub-band signals.

23. A decoder for decoding an encoded signal encoded by an encoder according to claim 12, the decoder comprising synthesis filter bank means for providing a decoded signal corresponding to the input signal, the decoder comprising:

means for extracting interpolated sub-band signals from the received or recorded encoded signal; and decimator means for decimating the plurality of extracted interpolated sub-band signals to remove interpolated values and applying the resulting plurality of decimated sub-band signals to the synthesis filter bank means, the synthesis filter bank means processing the plurality of decimated sub-band signals to reconstruct said input signal.

24. A decoder as claimed in claim 23, for use with the encoder of claim 16, to decode an encoded signal in which the interpolated signals have been frequency-shifted so that the interpolated sub-band signals occupy different frequency bands in the encoded signal;

wherein the extracting means comprises means for detecting the different frequency bands.

25. A decoder as claimed in claim 23 for decoding an encoded signal produced by the encoder of claim 17, wherein the extracting means comprises:

means for providing a plurality of carrier signals corresponding to those of said encoder;

and the means for extracting the interpolated sub-band signals from the received signal comprises:

demodulation means for using at least some of the carrier signals to demodulate the extracted modulated carrier signals to extract a plurality of demodulated sub-band signals corresponding to the plurality of sub-band signals.

26. A decoder as claimed in claim 25, for use with the encoder of claim 18, wherein the plurality of carrier signals have the same different frequencies as the carrier signals in the encoder.

27. A decoder as claimed in claim 23, for decoding a signal encoded by the encoder of claim 19, and wherein the synthesis filter bank means comprises a uniform filter bank for producing sub-bands each having the same bandwidth.

28. A decoder as claimed in claim 23, for decoding a signal encoded by the encoder of claim 20, wherein the synthesis filter bank means comprises a multiresolution filter bank and the decimator means decimates the extracted sub-band signals non-uniformly and complementarily to the interpolation.

29. A decoder as claimed in claim 28, for decoding a signal encoded by the encoder of claim 21, and wherein the multiresolution filter bank comprises an octave band filter bank implementing Inverse Discrete Wavelet Transform (DWT) to process a plurality of wavelets as said plurality of sub-band signals.

30. A decoder as claimed in claim 23, for decoding an encoded signal encoded by the encoder of claim 22 using fewer than the total number of interpolated sub-band signals generated by the analysis filter bank means, wherein the synthesis filter bank means substitutes zero-level signals for the unused sub-band signals.

31. A method of encoding an input signal for transmission or storage and decoding such encoded signal to reconstruct the input signal, the encoding of the input signal comprising the steps of using analysis filter bank means to analyze the input signal into a plurality of sub-band signals, each sub-band centered at a respective one of a corresponding plurality of frequencies, wherein the encoding comprises the steps of:

interpolating the plurality of sub-band signal to provide a corresponding plurality of interpolated sub-band signals each occupying the same frequency band as the others; and combining the interpolated sub-band signals to form the encoded signal for transmission or storage;

and the decoding of the encoded signal comprises the steps of:

extracting the plurality of interpolated sub-band signals from the received or recorded encoded signal;

decimating each of the plurality of extracted interpolated sub-band signals to remove the interpolated values; and using synthesis filter bank means complementary to said analysis filter bank means, processing the plurality of decimated sub-band signals to produce a decoded signal corresponding to the input signal.

32. A method as claimed in claim 31, wherein the interpolation step includes the step of upsampling intervals between actual samples of each of the plurality of sub-band signals and filtering each of the upsampled sub-band signals to determine values between actual values of the upsampled sub-band signals and insert the determined values or the appropriate intervals.

33. A method as claimed in claim 32, wherein the filtering is lowpass filtering.

34. A method as claimed in claim 33, wherein the filtering uses a Raise-Cosine filter.

35. A method as claimed in claim 31, wherein the step of combining the interpolated sub-band signals comprises the step of shifting one or more of the interpolated sub-band signals so that the interpolated sub-band signals occupy different frequency bands in the encoded signal.

36. A method as claimed in claim 31, wherein the combining of the interpolated sub-band signals comprises the steps of providing a plurality of carrier signals and using at least some of the interpolated sub-band signals each to modulate a respective one of the plurality of carrier signals, and the extracting of the plurality of interpolated sub-band signals comprises the steps of detecting the modulated carrier signals in the received signal and using a corresponding plurality of carrier signals to demodulate extracted modulated carrier signals.

37. A method as claimed in claim 36, wherein the plurality of carrier signals have different frequencies.

38. A method as claimed in claim 31, wherein the analyzing of the input signal uses a uniform filter bank to produce sub-band signals each having the same bandwidth, and the decoding uses a corresponding uniform filter bank as the synthesis filter bank means.

39. A method as claimed in claim 31, wherein the analyzing of the input signal uses a multiresolution filter bank to provide sub-band signals having different bandwidths, the interpolation rates are such that the resulting interpolated sub-band signals all have the same rate, the decimation of non-uniform and complementary to the interpolation, and the processing of the decimated sub-band signals uses a corresponding multiresolution filter bank as the synthesis filter bank means.

40. A method as claimed in claim 39, wherein the analyzing of the input signal uses an octave band filter bank implementing Discrete Wavelet Transform (DWT) to produce a plurality of wavelets as said plurality of sub-band signals, and the processing of the decimated sub-band signals uses an octave band filter bank implementing a corresponding Inverse Discrete Wavelet Transform.

41. A method as claimed in claim 31, wherein the combining step combines a selection of the plurality of interpolated sub-band signals and the decoding includes the step of supplying zero-level signals to the synthesis filter bank means to substitute for the omitted sub-band signals.

42. A method of encoding an input signal for transmission or storage comprising the steps of using analysis filter bank means to analyze the input signal into a plurality of sub-band signals, each sub-band centered at a respective one of a corresponding plurality of frequencies, comprising the steps of:

interpolating the plurality of sub-band signals to provide a corresponding plurality of interpolated sub-band signals each occupying the same frequency band as the others; and combining the interpolated sub-band signals to form the encoded signal for transmission or storage.

43. An encoding method as claimed in claim 42, wherein the interpolation comprises the step of upsampling intervals between actual samples of each of the plurality of sub-band signals and filtering each of the upsampled sub-band signals to determine values between actual values of the upsampled sub-band signal and insert the determined values at the appropriate interval.

44. An encoding method as claimed in claim 43, wherein the filtering is lowpass filtering.

45. An encoding method as claimed in claim 44, wherein the lowpass filtering is Raise Cosine filtering.

46. An encoding method as claimed in claim 42, wherein the step of combining the interpolated sub-band signals comprises the step of frequency-shifting one or more of the interpolated sub-band signals so that the interpolated sub-band signals occupy different frequency bands in the encoded signal.

47. An encoding method as claimed in claim 42, wherein the combining step comprises the steps of providing a plurality of carrier signals and using at least some of the interpolated sub-band signals each to modulate a respective one of the plurality of carrier signals.

48. An encoding method as claimed in claim 47, wherein the plurality of carrier signals have different frequencies.

49. An encoding method as claimed in claim 42, wherein the analyzing of the input signal uses a uniform filter bank for producing sub-bands having the same bandwidth.

50. An encoding method as claimed in claim 42, wherein the analyzing of the input signal uses a multiresolution filter bank for providing sub-bands having different bandwidths, and the interpolation rate is such that the resulting interpolated sub-band signals all have the same rate.

51. An encoding method as claimed in claim 50, wherein the analyzing of the input signal uses an octave band filter bank implementing Discrete Wavelet Transform (DWT) to produce a plurality of wavelets as said plurality of sub-band signals.

52. An encoding method as claimed in claim 42, wherein the combining step combines a selection of the plurality of interpolated sub-band signals.

53. A method of decoding an encoded signal encoded by the method of claim 42 and comprising a plurality of interpolated sub-band signals, comprising the steps of:

extracting the plurality of interpolated sub-band signals from the received or recorded encoded signal;

decimating each of the plurality of extracted interpolated sub-band signals to remove interpolated values; and using synthesis filter bank means complementary to an analysis filter bank means used to produce the interpolated sub-band signal, processing the plurality of decimated sub-band signals to produce a decoded signal corresponding to the input signal.

54. A decoding method as claimed in claim 53, for decoding a signal encoded by the method of claim 46, such that the interpolated sub-band signals occupy different frequency bands and wherein the extraction step comprises the steps of detecting the different frequency bands.

55. A decoding method as claimed in claim 53 for use in decoding an encoded signal encoded according to the method of claim 47 in which at least some of the interpolated sub-band signals are used to modulate respective ones of a plurality of carrier signals, wherein the extraction step comprises the steps of providing a plurality of carrier signals corresponding to those used during encoding, and using at least some of the carrier signals to demodulate extracted modulated carrier signals and provide the plurality of demodulated sub-band signals.

56. A decoding method as claimed in claim 55, for use in decoding an encoded signal encoded by the method of claim 48, wherein the plurality of carrier signals have the same different frequencies as the carrier signals used in the encoding of the encoded signal.

57. A decoding method as claimed in claim 53, for use in decoding a signal encoded according to the method of claim 49 using a uniform analysis filter bank, wherein the processing step uses a uniform filter bank for producing sub-bands having the same bandwidth.

58. A decoding method as claimed in claim 53, for decoding a signal encoded according to the method of claim 50 using a multiresolution filter bank, wherein the processing uses a multiresolution filter bank to process the sub-band signals having different bandwidths, and the extracted sub-band signals are decimated non-uniformly and at rates corresponding to those used to interpolate the corresponding sub-band signals.

59. A decoding method as claimed in claim 58, for decoding a signal encoded according to the method of claim 51 using an octave band filter bank implementing Discrete Wavelet Transform, wherein the processing step uses an octave band filter bank implementing an Inverse Discrete Wavelet Transform (DWT) to produce the decoded signal from the plurality of wavelets constituting said plurality of sub-band signals.

60. A decoding method as claimed in claim 53, for decoding a signal encoded according to the method of claim 52, whereby a selection of the interpolated sub-band signals are combined, wherein, zero-level signals are applied to the synthesis filter bank means to substitute for the sub-band signals omitted during encoding.

* * * * *